US012314948B2

(12) United States Patent
Abraham et al.

(10) Patent No.: US 12,314,948 B2
(45) Date of Patent: May 27, 2025

(54) TOUCHLESS EXPENSES WITH REAL-TIME CARD CHARGES

(71) Applicant: Oracle International Corporation, Redwood Shores, CA (US)

(72) Inventors: Dawn Abraham, Foster City, CA (US); Rondy C. Ng, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 5 days.

(21) Appl. No.: 18/295,756

(22) Filed: Apr. 4, 2023

(65) Prior Publication Data

US 2024/0127240 A1    Apr. 18, 2024

Related U.S. Application Data

(60) Provisional application No. 63/415,962, filed on Oct. 13, 2022.

(51) Int. Cl.
*G06Q 20/40* (2012.01)
*G06Q 20/10* (2012.01)
*G06Q 40/12* (2023.01)

(52) U.S. Cl.
CPC ......... *G06Q 20/401* (2013.01); *G06Q 20/102* (2013.01); *G06Q 40/12* (2013.12)

(58) Field of Classification Search
None
See application file for complete search history.

(56) References Cited

U.S. PATENT DOCUMENTS 5,966,126 A   10/1999  Szabo
6,029,144 A   2/2000   Barrett et al.
(Continued)

FOREIGN PATENT DOCUMENTS

CN    110544161 A    12/2019

OTHER PUBLICATIONS

Yang, Jie, et al. "Deep learning aided system design method for intelligent reimbursement robot." IEEE Access 7 (2019): 96232-96239 (Year: 2019).

(Continued)

*Primary Examiner* — Edward Chang
(74) *Attorney, Agent, or Firm* — Invoke

(57) ABSTRACT

An expense report generation system receives transaction authorization data from a card issuer and compares the data with expense report generation criteria to determine whether to generate an expense report, prior to settlement of the transaction, based on the authorization data. The expense report generation system evaluates additional data obtained from other data sources including contextual information of the employee, transaction authorization, location, and other employees to generate the expense report. The expense report generation system subsequently updates the generated expense report based on updated transaction authorization data and/or transaction settlement data. The expense report generation system trains and uses a machine learning model for efficiency and accuracy in generating expense reports from transaction authorization data while reducing an employee's burden in manually inputting expense information and the approval process burden.

25 Claims, 6 Drawing Sheets

(56) References Cited

U.S. PATENT DOCUMENTS

| | | |
|---|---|---|
| 9,892,106 B1 | 2/2018 | Lesner et al. |
| 10,235,720 B2 | 3/2019 | Abraham et al. |
| 10,325,223 B1 | 6/2019 | Arel et al. |
| 10,592,544 B1 | 3/2020 | Dasgupta et al. |
| 10,748,157 B1 | 8/2020 | Indyk et al. |
| 10,810,574 B1 | 10/2020 | Wilson et al. |
| 10,878,514 B2 | 12/2020 | Bender et al. |
| 11,068,477 B1 | 7/2021 | Tuckfield et al. |
| 11,321,784 B2 | 5/2022 | Verma et al. |
| 11,423,451 B1 | 8/2022 | Chaudhari et al. |
| 2006/0085408 A1 | 4/2006 | Morsa |
| 2006/0206506 A1* | 9/2006 | Fitzpatrick ............ G06Q 20/20 |
| 2008/0104001 A1 | 5/2008 | Kipp |
| 2009/0055270 A1 | 2/2009 | Magdon-Ismail et al. |
| 2009/0265232 A1 | 10/2009 | Gopalakrishnan et al. |
| 2010/0017316 A1 | 1/2010 | Joseph et al. |
| 2012/0185368 A1 | 7/2012 | Schloter et al. |
| 2012/0317003 A1 | 12/2012 | McGrane |
| 2013/0041792 A1 | 2/2013 | King et al. |
| 2013/0226751 A1 | 8/2013 | Friedholm et al. |
| 2014/0046812 A1 | 2/2014 | Fan et al. |
| 2014/0122146 A1 | 5/2014 | Deist et al. |
| 2015/0235143 A1 | 8/2015 | Eder |
| 2016/0042424 A1 | 2/2016 | MacNair et al. |
| 2016/0078566 A1 | 3/2016 | Farrell et al. |
| 2016/0171557 A1 | 6/2016 | Fanous et al. |
| 2016/0350867 A1 | 12/2016 | Votaw et al. |
| 2016/0358268 A1 | 12/2016 | Verma et al. |
| 2017/0004448 A1 | 1/2017 | Randles et al. |
| 2017/0083920 A1 | 3/2017 | Zoldi et al. |
| 2017/0116679 A1 | 4/2017 | Abraham et al. |
| 2018/0012268 A1 | 1/2018 | Simantov et al. |
| 2018/0075391 A1 | 3/2018 | Chung et al. |
| 2018/0137576 A1 | 5/2018 | Chu et al. |
| 2018/0322287 A1 | 11/2018 | Zhao et al. |
| 2018/0350006 A1 | 12/2018 | Agrawal et al. |
| 2019/0014488 A1 | 1/2019 | Tan et al. |
| 2019/0065564 A1 | 2/2019 | Twig et al. |
| 2019/0102392 A1 | 4/2019 | Tseretopoulos et al. |
| 2019/0116187 A1 | 4/2019 | Gahnoog et al. |
| 2019/0156198 A1 | 5/2019 | Mars et al. |
| 2019/0236095 A1 | 8/2019 | Achan et al. |
| 2019/0236552 A1 | 8/2019 | Rouseau et al. |
| 2019/0303781 A1 | 10/2019 | Clark et al. |
| 2019/0378050 A1 | 12/2019 | Edkin et al. |
| 2019/0378136 A1 | 12/2019 | Efraim et al. |
| 2019/0385080 A1 | 12/2019 | Wu et al. |
| 2020/0020015 A1 | 1/2020 | Anders et al. |
| 2020/0058078 A1 | 2/2020 | Li et al. |
| 2020/0065912 A1 | 2/2020 | Bender et al. |
| 2020/0074359 A1 | 3/2020 | Subramanian et al. |
| 2020/0118137 A1 | 4/2020 | Sood et al. |
| 2020/0234297 A1 | 7/2020 | Murray et al. |
| 2020/0258060 A1 | 8/2020 | Le et al. |
| 2020/0272309 A1 | 8/2020 | Xiao et al. |
| 2020/0279219 A1 | 9/2020 | Desai et al. |
| 2020/0293564 A1 | 9/2020 | Reh et al. |
| 2020/0293653 A1 | 9/2020 | Huang et al. |
| 2020/0311729 A1 | 10/2020 | Matthews et al. |
| 2021/0004370 A1 | 1/2021 | Sekharan et al. |
| 2021/0004810 A1 | 1/2021 | Lind et al. |
| 2021/0004949 A1 | 1/2021 | Broyda et al. |
| 2021/0073735 A1 | 3/2021 | Wang et al. |
| 2021/0073920 A1 | 3/2021 | Wang et al. |
| 2021/0073921 A1 | 3/2021 | Wang et al. |
| 2021/0073922 A1 | 3/2021 | Wang et al. |
| 2021/0398118 A1 | 12/2021 | Stark et al. |
| 2022/0261759 A1 | 8/2022 | Fredericks et al. |

OTHER PUBLICATIONS

Artjoms Suponenkovs, et al., "Application of image recognition and machine learning technologies for payment data processing review and challenges", 5th IEEE Workshop on Advances in Information, Electronic and Electrical Engineering (AIEEE), IEEE, 2017, pp. 1-6.

Iyengar, VijayS., et al. "Analytics for Audit and Business Controls in Corporate Travel and Entertainment." AusDM 7 (2007): 3-12 (Year: 2007).

Zeki Bozkus, et al., "Analytical expense management system." 2009 First International Conference on Networked Digital Technologies. IEEE, 2009, pp. 527-532.

Zhu et al., "Extracting relevant named entities for automated expense reimbursement", Proceedings of the 13th ACM SIGKDD international conference on Knowledge discovery and data mining, 2007, pp. 1004-1012.

Zhu, Guangyu, Timothy J. Bethea, and Vikas Krishna. "Extracting relevant named entities for automated expense reimbursement." Proceedings of the 13th ACM SIGKDD international conference on Knowledge discovery and data mining. 2007. (Year: 2007).

\* cited by examiner

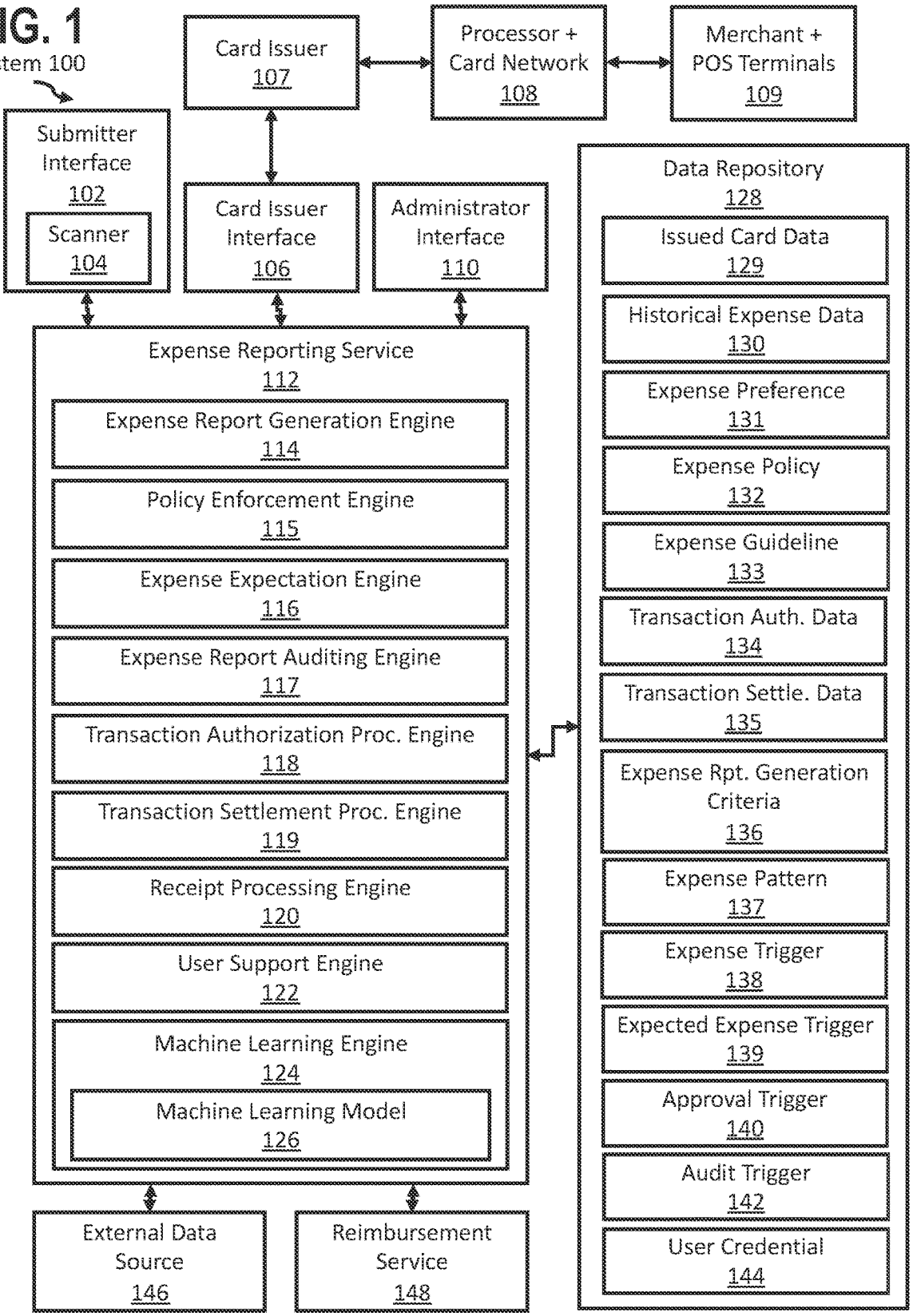

US 12,314,948 B2

TOUCHLESS EXPENSES WITH REAL-TIME CARD CHARGES

INCORPORATION BY REFERENCE; DISCLAIMER

The following application is hereby incorporated by reference: application No. 63/415,962, filed Oct. 13, 2022. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to machine learning techniques and applications. In particular, the present disclosure relates to training and using machine learning models to automate various aspects of expense reporting based on transaction authorization data.

BACKGROUND

During the course of business-related activity, employees sometimes incur business expenses that are charged onto a credit card or charge account. To document and account for such expenses after they have been incurred, an employee typically submits an expense report. An expense report is a report that includes one or more expense descriptions. Each expense description includes expense data that describes one or more business expenses incurred by the employee. Expense data may include but is not limited to: a name of the employee that incurred the expense, a date the expense was incurred, a type of expense, a reason for the expense, an amount of the expense, a venue corresponding to the expense, and a business project associated with the expense. Businesses typically impose limits on business expenses that may be incurred by the employee. Each expense limit may apply to an entire organization, a particular business unit, and/or one or more particular employees. Expense auditing is the process of determining, for each expense described in an expense report, whether the expense is approved.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1 illustrates a system in accordance with one or more embodiments;

DETAILED DESCRIPTION

Figure 2A:
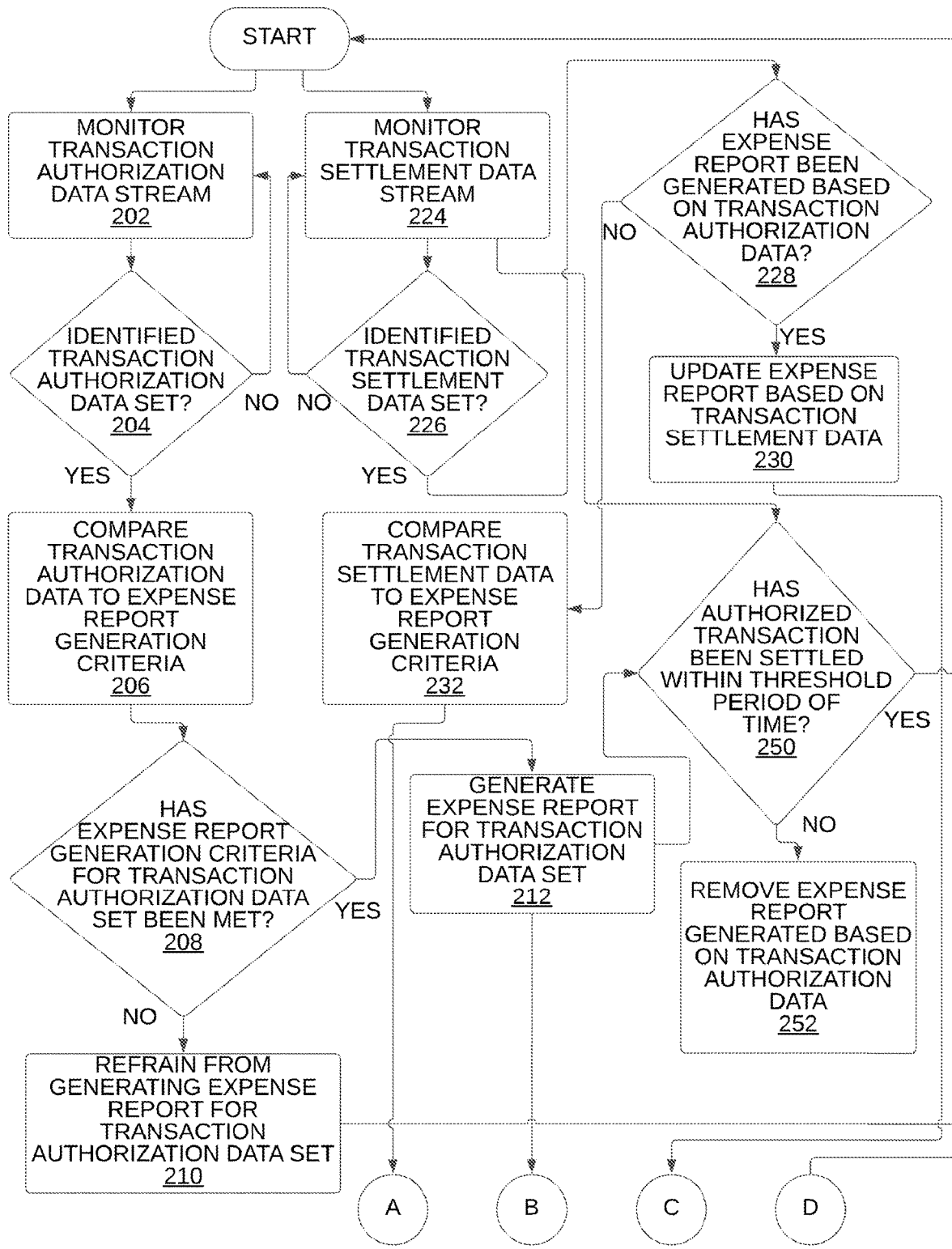
FIGS. 2A and 2B illustrate a set of operations for generating an expense report based on transaction authorization data in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. GENERATING AN EXPENSE REPORT
4. INTEGRATING MACHINE LEARNING INTO EXPENSE PROCESSING
5. ILLUSTRATIVE EXAMPLES
6. HARDWARE OVERVIEW
7. COMPUTER NETWORKS AND CLOUD NETWORKS
8. MICROSERVICE APPLICATIONS
9. MISCELLANEOUS; EXTENSIONS

1. General Overview

During the course of business-related activity (e.g., domestic or international travel, site visits and/or other kinds of business meetings, meals with customers and/or prospective customers, routine business operations, promotional events, and/or any other kind of business-related activity or combination thereof), employees sometimes incur business expenses that are charged onto a credit card or charge account provided to the employees by their employer (referred to herein as a corporate card), business expenses that are charged onto their personal credit card(s) or charge account(s) (referred to herein as a personal card), and/or personal expenses that are charged onto a corporate card. Employees sometimes are responsible for paying their corporate card bills themselves, as they do for their personal card bills, while their employer is responsible for reimbursing them for eligible business expenses that the employees report to their employer via an expense report. Employers sometimes are responsible for paying the corporate card bills while employees are responsible for documenting all eligible business expenses charged to the corporate card in expense reports and reimbursing the employer for any personal expenses and non-eligible or disallowed business expenses charged to the corporate card.

Generating expense reports may be subject to various kinds of errors and inefficiencies. If an employee neglects to include or properly document an incurred expense in an expense report, the employer may require the employee to reimburse the employer for that expense as a personal expense and not a business expense. If an employee does not submit a properly documented expense report in a timely manner, the employer may have inaccurate accounting records for matters pertaining to the expense, which may lead to inaccurate client invoicing or inaccurate financial projections. If an employee fails to properly manage spending, the employee may incur expenses, charged on the corporate card or otherwise paid for, that are partially or wholly unacceptable by the employer's policies. Because preparing expense reports manually is time-consuming, an employee may delay preparing an expense report and subsequently forget to include details and documents needed to substantiate business expenses, charged on the corporate card or otherwise paid for, in the expense report. The employees' delay may result in their managing the details of their business expenses through receipts, personal notes, etc., resulting in a loss of information, delayed submission and reimbursement, and frustration. Some employees may habitually overspend relative to an expense limit, while other employees may habitually underspend relative to the same expense limit. Some employees may charge personal expenses to the corporate card, whether they are included in subsequently filed expense reports or not. Habitual overspending, underspending, personal expense charges on the corporate card, and/or inaccurate expense reporting may adversely affect organizational and/or individual expense budgets. In addition, depending on the number of employees submitting expense reports and/or the complexity of the organization's permissible business expense rules, auditing expense reports may be time-consuming and error-prone. Generating and/or auditing expense reports may be subject to many other kinds of errors and inefficiencies.

One or more embodiments improve the timeliness, thoroughness, and/or accuracy of expense reporting by generating expense reports for business expenses based on transaction authorization data (e.g., for credit or debit card transactions) rather than waiting until card transactions are settled. The expense reports, generated based on authorization data, may be modified and/or deleted based on settlement data that is later received for the same transaction or when no settlement data is received for the transaction.

The expense reports generated based on transaction authorization data may be generated in real time, e.g., near instantaneously, when a registered card (e.g., a corporate card) is used for paying for a business expense. Generating the expense reports may also utilize contextual data for the transaction authorization and employee for whom the expense report is being generated, historical transaction authorization and settlement records associated with accepted expense reports, and contemporaneous data of other employees relating to business expenses. The system may identify missing information needed for generating the expense report by applying company policies and contextual information pertaining to the transaction and/or the employee responsible for the transaction, historical expense report data, related data pertaining to other employees that may be participating in an event associated with the transaction, and data obtained and/or inferred from a receipt scanned in by the employee if available. The system may determine a likelihood that the expense is a personal expense. The employee using the registered card may be quickly notified (e.g., in near-real-time) of the newly generated expense report. The employee may be requested to promptly enter any missing required information for the generated expense report, for example, prior to the transaction being settled. The generated expense report may be held after being prepared, with employee input, until transaction settlement data associated with the transaction authorization data upon which the expense report was based is received. After the transaction settlement data is received, the generated expense report may be finalized and submitted for exception-based approval based on automatic submission settings.

According to some embodiments, an employer registers with a card issuer to receive real time authorization data. The card issuer configures its card transaction processing systems to send the real time authorization data for the employer to the employer's expense reporting application. When employees incur expenses on their corporate cards issued by the card issuer, the card issuer pushes authorization data to the employer's expense reporting application. The employer's expense reporting application identifies the received authorization data and ensures, using security tokens, that the authorization data is authorized for processing by the employer's expense reporting application. The employer's expense reporting application matches the received authorization data to the correct employee and creates expense report entries from the authorization data set sent by the card issuer. The employer's expense reporting application derives additional details about the expense associated with the transaction authorization data, applies the employer's expense policies, derives information about multiple employees that may be associated with the expense, and identifies personal expenses that may be associated with the transaction authorization data. The employer's expense reporting application notifies the employee that the real time charge has arrived. For expense report items in which the employer's expense reporting application anticipates receiving automated receipts, the employer's expense reporting application extracts details and derives itemizations from the receipts, and adds this extracted and derived information to the expense report associated with the transaction authorization data. When transaction settlement data is received, the employer's expense reporting application updates the expense report associated with the transaction authorization data with the transaction settlement data. If employees provide the receipts for these expenses, for example, by scanning them in or emailing them to the expense reporting application, the receipts are matched to the associated expense report and data obtained from the receipts are merged with the expense report data obtained from other sources. Employees are notified of the expense report when automatic submission is nearing with details about the expenses included in the expense report that are ready to be submitted. These details may list expense report items that have errors or missing information that must be addressed prior to submission, and items that are ready for submission. The employer's expense reporting application automatically submits expense reports that are complete for an exception-based approval process.

Embodiments may improve the timeliness of expense reporting by identifying and generating expense reports for potentially acceptable and/or reimbursable expenses, based on transaction authorization data, before an employee would get around to generating and/or submitting an expense report based on fully settled transactions. Expense reports may be generated based on transaction authorization data as soon as employees incur business expenses, thereby reducing or eliminating manual expense entry and expediting expense report submission. Embodiments may improve the thoroughness of expense reporting by capturing potentially acceptable and/or reimbursable expenses that an employee may otherwise forget about and/or overlook if the employee generates the expense report later based on fully settled data. Embodiments may improve the accuracy of expense reporting by using available data to generate expense descriptions, rather than relying on an employee to manually enter all the data for the expense descriptions into spreadsheets or other electronic expense report templates.

The expense reporting system may further leverage machine learning to facilitate and automate various aspects of generating expense reports based on transaction authorization data. In some embodiments, the expense reporting system learns how to classify and process the generation of expense reporting based on a set of training examples. For example, the expense reporting system may automatically learn what patterns are predictive of the likelihood that a transaction authorization data set represents an acceptable and/or reimbursable business expense even though the patterns are not hard-coded into the expense reporting system. As another example, the expense reporting system may automatically learn what patterns are predictive of the likelihood that, based on at least a transaction authorization data set, an employee responsible for the transaction authorization would need to review and/or edit an automatically generated expense report based on the transaction authorization data set prior to submission, even though the patterns are not hard-coded into the expense reporting system. When new activities or expenses are identified in transaction authorization data sets, the expense reporting system may estimate unknown labels or classifications based on the learned patterns. The expense reporting system may trigger one or more automated actions based on the estimated label for the new expenses or activities.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a submitter interface 102, a card issuer interface 106, an administrator interface 110, an expense reporting service 112, a data repository 128, an external data source 146, a reimbursement service 148, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In some embodiments the expense reporting service 122 may include modules and engines configured to generate expense reports based on received transaction authorization data and employee notification, computationally match transaction authorization data with subsequently received transaction settlement data and other relevant data, enforce expense reporting and reimbursement policies and additional data capture requirements, automatically submit expense reports for reimbursement without user review according to specified submission standards, and support intelligent expense report approval, auditing, and reimbursement processing.

In some embodiments, the card issuer interface 106 may support integration of the expense reporting service 112 with a card issuer 107 to receive a stream of transaction authorization data from the card issuer 107. A transaction is a financial debit or credit to a financial account (e.g., a charge card, a credit card, an automated teller machine (ATM) card, or a debit card) at a financial institution (e.g., card issuer 107) made by a merchant (e.g., merchant+POS terminals 109) via a processor+card network 108. Transaction authorization data is data available to a bank or card issuer 107 pertaining to authorizing a charge to a card and/or a hold placed on the card, when the charge to the card has not yet settled. Transaction settlement data is transaction data available to a bank or card issuer 107 pertaining to an authorized charge to a card, after the transaction has been completed and the charge to the card has settled. The stream of transaction authorization data may be generated by the card issuer 107 in response to requests for authorization of transactions being attempted at merchant+point-of-sale (POS) terminals 109 using charge cards, credit cards, debit cards, and the like issued by the card issuer 107 via a processor+card network 108. The stream of transaction authorization data received via the card issuer interface 106 may also be received by the merchant+POS terminals 109. The stream of transaction authorization data facilitates the expense reporting service 112 to generate a draft expense report as soon as associated transaction authorization data is received, populate the draft expense report with relevant expense data as soon as the transaction authorization data is received, and thereby document the business expense for the draft expense report as soon as an employee incurs the business expense.

In some embodiments, the card issuer interface 106 may receive a stream of transaction settlement data from the card issuer 107. The stream of transaction authorization data may be generated by the card issuer 107 after settlement of previously authorized transactions attempted at merchant+point-of-sale (POS) terminals 109 using charge cards, credit cards, debit cards, and the like issued by the card issuer 107 via the processor+card network 108.

In some embodiments, each of submitter interface 102 and administrator interface 110 refers to hardware and/or software configured to facilitate communications between a user (e.g., an employee) and an expense reporting service 112. A submitter interface 102 may be used by a user, such as an employee, who is responsible for preparing and submitting expense descriptions and/or expense reports. The submitter interface 102 may be associated with one or more devices for obtaining visual media that represents a receipt for an expense, such as a scanner 104, a camera, a video device, or any other kind of device configured to capture visual media. An administrator interface 110 may be used by a user, such as an employee in an administration, accounting, auditing, or managerial role, who is responsible for determining and/or configuring parameters, rules, etc., that are used by an expense reporting service 112; auditing expense reports; and/or approving expense reports prior to submission for reimbursement. In an embodiment, expense reports are not subject to managerial review prior to submission for reimbursement. One or more of a submitter interface 102 and administrator interface 110 may be the same interface. One or more of the submitter interface 102 and administrator interface 110 may represent multiple different specialized interfaces configured to perform one or more specific functions or interface with one or more specific systems for accomplishing the objectives or performing the operations described with reference to the respective submitter interface 102 or administrator interface 110 herein. A user may have multiple roles corresponding to submitter, reviewer, approver, auditor, and/or administrator. For example, an employee who audits expense reports (e.g., via the administrator interface 110) may also submit their own expense reports (e.g., via the submitter interface 102).

In some embodiments, a user interface (e.g., submitter interface 102 and/or administrator interface 110) renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In some embodiments, different components of a user interface (e.g., submitter interface 102 and/or administrator interface 110) are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, a user interface may be specified in one or more other languages, such as Java, C, or C++.

In some embodiments, an expense reporting service 112 includes an expense report generation engine 114. An expense report generation engine 114 refers to hardware and/or software configured to perform operations described herein (including such operations as may be incorporated by reference) for generating expense reports.

In some embodiments, an expense reporting service 112 includes a policy enforcement engine 115. A policy enforcement engine 115 refers to hardware and/or software configured to perform operations described herein (including such operations as may be incorporated by reference) for enforcing expense policies 132 and expense guidelines 133, detecting expense fraud, detecting fraudulent transactions, etc. For example, the policy enforcement engine 115 may verify that expense amounts are within reasonable spending limits based on various factors, for example, historical expense data 130 associated with the employer and/or employee, expense policies 132, expense guidelines 133, an user's allowable business expense history, a user's department's expense history, a user's personal expense history, an user's department's and/or employer's current budget constraints, etc.

In some embodiments, an expense reporting service 112 includes an expense expectation engine 116. An expense expectation engine 116 refers to hardware and/or software configured to perform operations described herein (including such operations as may be incorporated by reference) for predicting or expecting expenses.

In some embodiments, an expense reporting service 112 includes an expense report auditing engine 117. An expense report auditing engine 117 refers to hardware and/or software configured to perform operations described herein (including such operations as may be incorporated by reference) for auditing expense descriptions and/or expense reports.

In some embodiments, an expense reporting service 112 includes a transaction authorization data processing engine 118. A transaction authorization data processing engine 118 refers to hardware and/or software configured to perform operations described herein (including such operations as may be incorporated by reference) for processing transaction authorization data. Transaction authorization data may include, for example, an authorization identifier number, a transaction number, an authorization code provided by the card issuer when the transaction is approved, a code indicating whether this is the first authorization data set for this transaction or a subsequent authorization data set for the same transaction, authorized amounts, transaction date and time, authorized merchant data (identifier code, name, city, state/province, ZIP/postal code), merchant category, country of transaction, transaction conditions (e.g., pre-authorization, normal, customer not present, attended or unattended terminal, no terminal used, voice/audio response unit authorization, merchant suspicious, card not present, mail order, customer ID verified, address verification required, electronic commerce, return), authorized transaction descriptions, card processor number, card issuer number, employee identifier (distinct from card number), employer identifier, currency used by card issuer, currency used by merchant for transaction, etc.

The operations performed by the transaction authorization data processing engine 118 may include storing transaction authorization data 134 in the data repository 128, removing transaction authorization data 134 from the data repository 128 if corresponding transaction settlement data 135 is not received within a threshold time period, updating transaction authorization data 134 (e.g., charged amount) stored in the data repository 128 when updated transaction authorization data 134 is received (e.g., via the card issuer interface 106) and/or when corresponding transaction settlement data 135 is received (e.g., via the card issuer interface 106), and/or other functions associated with transaction authorization data 134. The threshold periods for receipt of transaction settlement data 135 and/or receipts to validate transaction authorization data 134 may be variable based on factors such as the employee, employee group, merchant identity, merchant type, merchant country, merchant state, merchant city, or other factors.

The transaction authorization data processing engine 118 may analyze received transaction authorization data 134 to determine whether an expense report should be generated based on the received transaction authorization data 134, for example, based on various expense policies 132, expense guidelines 133, whether the expenditure is a personal or business expenditure, and/or expense report generation criteria 136. The transaction authorization data processing engine 118 may analyze received transaction authorization data 134 to determine a likelihood that the associated authorization data may change soon or be updated by received updated transaction authorization data 134 soon. The time period considered to be "soon" may also be specified in the data repository 128 according to various factors, for example, merchant type, merchant identity, merchant country, merchant state, merchant city, user, etc. The transaction authorization data processing engine 118 may analyze received transaction authorization data 134 to determine whether any updates to the transaction authorization data 134 are likely prior to receiving corresponding transaction settlement data 135.

In some embodiments, an expense reporting service 112 includes a transaction settlement data processing engine 119. A transaction settlement data processing engine 119 refers to hardware and/or software configured to perform operations described herein (including such operations as may be incorporated by reference) for processing transaction settlement data. The transaction settlement data may include, for example, final settled transaction amounts, the authorized identifier number to match the transaction settlement data with the associated transaction authorization data, and any other data also included in the transaction authorization data. The operations performed by the transaction settlement data processing engine 119 may include updating transaction authorization data 134 (e.g., charged amount) stored in the data repository 128 and/or storing transaction settlement data 135 in the data repository 128 when when transaction settlement data 135 corresponding to, replacing, or substituting for transaction authorization data 134 is received (e.g., via the card issuer interface 106), and/or other functions associated with transaction settlement data 135. The transaction settlement data processing engine 119 may mark the most recent corresponding transaction authorization data 134 as the last set of transaction authorization data 134 corresponding to the transaction settlement data 135 being processed. The threshold periods for receipt of transaction settlement data 135 and/or receipts to validate transaction settlement data 135 may be variable based on factors such as the employee, employee group, merchant identity, merchant type, merchant country, merchant state, merchant city, or other factors.

In some embodiments, an expense reporting service 112 includes a receipt processing engine 120. A receipt processing engine 120 refers to hardware and/or software configured to perform operations described herein (including such operations as may be incorporated by reference) for processing expense receipts. For example, the receipt processing engine 120 may be operable to perform optical character recognition (OCR) on receipts scanned via the scanner 104 or camera of the submitter interface 102. The receipt processing engine 120 may be operable to recognize merchant type, product or service type, associated expense type, and other data for including in an expense report for a business expense substantiated by the receipt. The receipt processing engine 120 may be operable to input data obtained by processing the receipt into a generated expense report or into a query to a user to request confirmation of the correctness of the data for being added to the expense report being generated.

In some embodiments, an expense reporting service 112 includes a user support engine 122. A user support engine 122 refers to hardware and/or software configured to perform operations described herein (including such operations as may be incorporated by reference) for processing and responding to user queries submitted to the expense reporting service 112.

In some embodiments, one or more components of the expense reporting service use a machine learning engine 124. Machine learning includes various techniques in the field of artificial intelligence that deal with computer-implemented, user-independent processes for solving problems that have variable inputs.

In some embodiments, the machine learning engine 124 trains a machine learning model 126 to perform one or more operations. Training a machine learning model 126 uses training data to generate a function that, given one or more inputs to the machine learning model 126, computes a corresponding output. The output may correspond to a prediction based on prior machine learning. In some embodiments, the output includes a label, classification, and/or categorization assigned to the provided input(s). The machine learning model 126 corresponds to a learned model for performing the desired operation(s) (e.g., labeling, classifying, and/or categorizing inputs). An expense reporting service 112 may use multiple machine learning engines 124 and/or multiple machine learning models 126 for different purposes.

Candidate machine learning models may apply weights as a function of extracted features. In some cases, the system may generate and train a candidate recurrent neural network model, such as a long short-term memory (LSTM) model. With recurrent neural networks, one or more network nodes or "cells" may include a memory. A memory allows individual nodes in the neural network to capture dependencies based on the order in which feature vectors are fed through the model. The weights applied to a feature vector representing one expense or activity may depend on its position within a sequence of feature vector representations. Thus, the nodes may have a memory to remember relevant temporal dependencies between different expenses and/or activities. For example, a dinner expense in isolation may have a first set of weights applied by nodes as a function of the respective feature vector for the expense. However, if the dinner expense is immediately preceded by an earlier dinner expense, then a different set of weights may be applied by one or more nodes based on the memory of the preceding expense. In this case, whether the second dinner expense is reimbursable or not may be affected by the first dinner expense. As another example, one or more nodes may apply different weights if an expense is unique or a duplicate of another expense on the same day. In this case, the trained machine learning model may automatically filter out and reject duplicate expenses made on the same day while recurring expenses (e.g., monthly subscriptions) may be permitted. Additionally or alternatively, the system may generate and train other candidate models, such as support vector machines, decision trees, Bayes classifiers, and/or fuzzy logic models.

In some embodiments, the machine learning engine 124 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 124 receives positive and/or negative reinforcement in the process of attempting to solve a particular problem (e.g., to optimize performance in a particular scenario, according to one or more predefined performance criteria). In some embodiments, the machine learning engine 124 initially uses supervised learning to train the machine learning model 126 and then uses unsupervised learning to update the machine learning model 126 on an ongoing basis.

In some embodiments, a machine learning engine 124 may use many different techniques to label, classify, and/or categorize inputs. A machine learning engine 124 may transform inputs into feature vectors that describe one or more properties ("features") of the inputs. The machine learning engine 124 may label, classify, and/or categorize the inputs based on the feature vectors. Alternatively or additionally, a machine learning engine 124 may use clustering (also referred to as cluster analysis) to identify commonalities in the inputs. The machine learning engine 124 may group (i.e., cluster) the inputs based on those commonalities. The machine learning engine 124 may use hierarchical clustering, k-means clustering, and/or another clustering method or combination thereof. In some embodiments, a machine learning engine 124 includes an artificial neural network. An artificial neural network includes multiple nodes (also referred to as artificial neurons) and edges between nodes. Edges may be associated with corresponding weights that represent the strengths of connections between nodes, which the machine learning engine 124 adjusts as machine learning proceeds. Alternatively or additionally, a machine learning engine 124 may include a support vector machine. A support vector machine represents inputs as vectors. The machine learning engine 124 may label, classify, and/or categorizes inputs based on the vectors. The coordinates of the vectors and corresponding boundaries between different hyperplanes may be adjusted as machine learning proceeds. Alternatively or additionally, the machine learning engine 124 may use a naïve Bayes classifier to label, classify, and/or categorize inputs. Alternatively or additionally, given a particular input, a machine learning model may apply a decision tree to predict an output for the given input. Alternatively or additionally, a machine learning engine 124 may apply fuzzy logic in situations where labeling, classifying, and/or categorizing an input among a fixed set of mutually exclusive options is impossible or impractical. The aforementioned machine learning model 126 and techniques are discussed for exemplary purposes only and should not be construed as limiting one or more embodiments.

In some embodiments, as a machine learning engine 124 applies different inputs to a machine learning model 126, the corresponding outputs are not always accurate. As an example, the machine learning engine 124 may use supervised learning to train a machine learning model 126. After training the machine learning model 126, if a subsequent input is identical to an input that was included in labeled training data and the output is identical to the supervisory signal in the training data, then output is certain to be accurate. If an input is different from inputs that were included in labeled training data, then the machine learning engine 124 may generate a corresponding output that is inaccurate or of uncertain accuracy. In addition to producing a particular output for a given input, the machine learning engine 124 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In some embodiments, the system compares the labels estimated through the one or more candidate models with observed labels to determine an estimation error. The system may perform this comparison for a test set of examples, which may be a subset of examples in the training dataset that were not used to generate and fit the candidate models. The total estimation error for a candidate may be computed as a function of the magnitude of the difference and/or the number of examples for which the estimated label was wrongly predicted.

In some embodiments, the system determines whether to adjust the weights and/or other model parameters based on the estimation error. Adjustments may be made until a candidate model that minimizes the estimation error or otherwise achieves a threshold level of estimation error is identified. The process may circle back to comparing estimated labels to determine an estimation error to make adjustments and continue training the machine learning model.

In some embodiments, the system selects a candidate machine learning model parameters based on the estimation error. For example, the system may select a machine learning model having weights and other model parameters (e.g., selected feature combinations used to form the feature vectors) that yield the lowest estimation error for the test dataset.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. As previously mentioned, a given example may include a sequence of related expenses and/or activities incurred on a trip. Each expense or activity may be processed as a separate discrete instance of time. For instance, an example may include expenses $e_1$, $e_2$, and $e_3$ corresponding to times t, t+1, and t+2, respectively. Backpropagation through time may perform adjustments through gradient descent starting at time t+2 and moving backward in time to t+1 and then to t. Further, the backpropagation process may adjust the memory parameters of a cell such that a cell remembers contributions from previous expenses in the sequence of expenses. For example, a cell computing a contribution for $e_3$ may have a memory of the contribution of $e_2$, which has a memory of $e_1$. The memory may serve as a feedback connection such that the output of a cell at one time (e.g., t) is used as an input to the next time in the sequence (e.g., t+1). The gradient descent techniques may account for these feedback connections such that the contribution of one expense or activity to a cell's output may affect the contribution of the next expense or activity in the cell's output. Thus, the contribution of $e_1$ may affect the contribution of $e_2$, etc.

Additionally or alternatively, the system may train other types of machine learning models. For example, the system may adjust the boundaries of a hyperplane in a support vector machine or node weights within a decision tree model to minimize estimation error. Once trained, the machine learning model may be used to estimate labels for new examples of expenses.

In some embodiments, a data repository 128 is any type of storage unit and/or device (e.g., a file system, database, collection of tables, or any other storage mechanism) for storing data. Further, a data repository 128 may include multiple different storage units and/or devices. The multiple different storage units and/or devices may or may not be of the same type or located at the same physical site. Further, a data repository 128 may be implemented or may execute on the same computing system as one or more other components of the system 100. Alternatively or additionally, a data repository 128 may be implemented or executed on a computing system separate from one or more other components of the system 100. A data repository 128 may be communicatively coupled to one or more other components of the system 100 via a direct connection or via a network.

In some embodiments, a data repository 128 is configured to store issued card data 129. Issued card data 129 may include any kind of data associated with charge cards, debit cards, corporate credit cards, personal credit cards, and/or any other financial accounts that identify a financial institution, an account at the financial institution, and a holder of the account at the financial institution responsible for financial transactions performed at the merchant+POS terminals 109, submitted to the card issuer 107 via the processor+card network 108 to be authorized, declined, and/or settled, and reported to the expense reporting service 112 via the card issuer interface 106. When a financial account (e.g., a corporate card or a personal card) is registered in the issued card data 129, the expense reporting service 112 may perform operations disclosed herein to generate and submit expense reports based on pre-settlement transaction authorization data received from the card issuer 107 via the card issuer interface 106, where the pre-settlement transaction authorization data is associated with the financial account registered in the issued card data 129.

In some embodiments, a data repository 128 is configured to store historical expense data 130. Historical expense data 130 may include any kind of data that the expense reporting service 112 has previously received and/or generated in association with expenses. Specifically, the historical expense data 130 may include expense reports, expense descriptions, metadata associated with expenses (e.g., geo-tags, dates and times, transaction authorization data, transaction settlement data, explanatory notes, and/or another kind of metadata or combination thereof), and/or any other kind of data or combination thereof associated with expenses. Historical expense data 130 may include data that is associated with one or more employees' target activity, which may also be associated (directly or indirectly) with one or more expenses. For example, historical expense data 130 may include one or more itineraries, location check-ins, phone records, emails, social media messages, calendar appointments, and/or any other kind of data or combination thereof associated with target activity.

In some embodiments, a data repository 128 is configured to store one or more expense preferences 131. An expense preference 131 includes one or move values that indicates one or more employees' preferences related to expenses that the employee(s) may incur during target activity. For example, an expense preference 131 may indicate that an employee prefers ride sharing over public transportation. As another example, an expense preference 131 may indicate that an employee has a dietary restriction (e.g., vegetarian, vegan, kosher, etc.). As another example, an expense preference 131 may indicate that an employee likes or dislikes a particular restaurant, hotel, or other establishment. An embodiment, an expense reporting service 112 uses a machine learning engine 124 to infer one or more employee preferences 131 from historical expense data 130. One or more triggers described herein may be based, at least in part, on one or more expense preferences 131.

In some embodiments, a data repository 128 is configured to store one or more expense policies 132. An expense policy 132 may be a set of one or more codified rules corresponding to criteria for reimbursable expenses or business expenses permissible to be charged directly onto a corporate card. For example, an expense policy 132 may define one or more expense categories that are used to categorize reimbursable expenses (e.g., meals, transportation, incidentals, equipment, etc.). As another example, an expense policy 132 may define an expense limit that is applicable to one or more employees and/or one or more expense categories for a particular unit of time (e.g., day, week, month, year, etc.). As another example, an expense policy 132 may define an expense amount that is considered reasonable and/or an expense amount that is considered unreasonable (e.g., based on expense type, vendor, employee, group of employees, location of expense, date of expense, time of expense, etc.) As another example, an expense policy 132 may identify one or more kinds of expenses and/or establishments (e.g., particular stores or restaurants) for which expenses are not reimbursable (e.g., non-business charges, unreasonably high expense amounts, etc.). Many different kinds of expense policy 132 may be defined. An expense policy 132 may apply the level of an entire organization, a business unit, a team, an individual, or any other set of one or more employees or combination thereof.

In some embodiments, a data repository 128 is configured to store one or more expense guidelines 133. An expense guideline 133 may be a set of one or more codified rules corresponding to best practices for expenses and/or responsible spending guidelines. An expense guideline 133 may be more restrictive than an expense policy 132. For example, a particular expense that satisfies an expense policy 132 may fail to satisfy an expense guideline 133 because, even though the expense is within an allowable limit under the expense policy 132, the expense is inconsistent with responsible spending guidelines. An expense guideline 133 may apply the level of an entire organization, a business unit, a team, an individual, or any other set of one or more employees or combination thereof. As another example, an expense guideline 133 may define an expense amount that is considered reasonable and/or an expense amount that is considered unreasonable (e.g., based on expense type, vendor, employee, group of employees, location of expense, date of expense, time of expense, etc.). As another example, an expense guideline 133 may specify tools for users to track average prices, best deal prices, etc. to aid in making cost-conscious spending decisions (e.g., YELP, GOOGLE, TRIPADVISOR, etc.). As another example, an expense guideline 133 may specify recommendations for expense amounts and preferred vendors based on data obtained from price and/or vendor benchmarking websites (e.g., YELP, GOOGLE, TRIPADVISOR, etc.).

In some embodiments, a data repository 128 is configured to store transaction authorization data 134. The transaction authorization data 134 may include data received from the card issuer 107 by the expense reporting service 112 via the card issuer interface 106. The transaction authorization data 134 may include data associated with one or more monetary transactions authorized by (and/or denied authorization by) the card issuer 107 at one or more merchant+POS terminals 109 in association with a credit card, debit card, charge card, corporate card, personal card, etc. The transaction authorization data 134 may include a card number, name and/or contact information of a user performing the transaction, whether the card was present for the transaction, an authorized transaction monetary amount, an authorization ID number, a date and time of authorization, a denied attempted authorization transaction monetary amount, a date and time of denial of authorization, a merchant ID, a merchant name, a merchant location, a merchant type or category, a list of items included in the authorized transaction (e.g., products and/or services), and/or other data associated with the transaction provided by the card issuer 107.

In some embodiments, a data repository 128 is configured to store transaction settlement data 135. The transaction settlement data 135 may include data received from the card issuer 107 by the expense reporting service 112 via the card issuer interface 106. The transaction settlement data 135 may include data associated with one or more monetary transactions settled by the card issuer 107 at one or more merchant+POS terminals 109 in association with a credit card, debit card, charge card, corporate card, personal card, etc. The transaction settlement data 135 may include a card number, name and/or contact information of a user performing the transaction, whether the card was present for the transaction, a settled transaction monetary amount, a date and time of authorization, an original associated authorization ID number, a date and time of settlement, a merchant ID, a merchant name, a merchant location, a merchant type or category, a list of items included in the settled transaction (e.g., products and/or services), and/or other data associated with the transaction provided by the card issuer 107.

In some embodiments, a data repository 128 is configured to store expense report generation criteria 136. The expense report generation criteria 136 may include criteria for determining whether an expense report should be generated based on an authorized transaction before the transaction settles, a settled transaction, or not for the transaction even after settled. The expense report generation criteria 136 may include criteria for timing of generation of the expense report after a transaction is authorized. The expense report generation criteria 136 may be based on data pertaining to a user of the card for which a transaction was authorized or settled, transaction authorization data, transaction settlement data, and/or other data stored in the data repository 128.

In some embodiments, a data repository 128 is configured to store one or more expense patterns 137. An expense pattern 137 identifies a typical and/or expected arrangement of expenses associated with target activity. An expense pattern 137 may be associated with target activity having one or more shared characteristics (e.g., a certain kind of business trip, business-related activity for a particular category of employees, or any other kind of shared characteristic or combination thereof). An expense pattern 137 may identify expenses that are typical for target activity having the shared characteristic(s). In one example, an expense pattern 137 identifies that international business travel typically includes: (1) airfare to and from the destination; (2) a rental car, public transportation, and/or ride sharing at the destination; (3) a hotel for the duration of the trip; (4) an international data roaming plan; and (5) three meals per day at the destination. An expense reporting system 112 may use an expense pattern 137, for example, in the transaction authorization data processing engine 118 and/or in the transaction settlement data processing engine 119, to identify reimbursable expenses charged to a personal card or eligible business expenses charged to a corporate card. In some embodiments, an expense reporting service 112 uses a machine learning engine 124 to infer one or more expense patterns 137, based at least in part on historical expense data 130.

In some embodiments, a data repository 128 is configured to store one or more expense triggers 138. An expense trigger 138 is a codified set of rules and/or a set of automatically learned patterns that captures one or more conditions for identifying expenses associated with one or more employees' target activity. An expense identified by an expense trigger 138 may be an expense identified by the transaction authorization data processing engine 118 while processing a transaction authorization data stream received from the card issuer 107 via the card issuer interface 106.

In some embodiments, an expense trigger 138 is based, at least in part, on data corresponding to target activity of an employee and/or historical expense data 130. Such data upon which an expense trigger 138 may be based may include calendar data, email data, text/SMS message data, chat/messaging app data, travel/trip booking app data, GPS or geolocation data, and other data associated with employee activities. As one example, an expense trigger 138 identifies that a transportation expense may be available when an employee travels from one location to another (e.g., from the employee's home or office to the airport). As another example, an expense trigger 138 identifies that a hotel expense may be available when geolocation data (e.g., from a global positioning system (GPS), a social media check-in, and/or any other kind of data source that supplies geolocation data) indicates that the user has arrived at a hotel or is leaving a hotel. As another example, an expense trigger 138 identifies that a meal expense may be available when geolocation data (e.g., from a global positioning system (GPS), a social media check-in, and/or any other kind of data source that supplies geolocation data) indicates that the user has visited a restaurant.

In some embodiments, when an expense trigger 138 identifies an expense for travel to a location, where return travel is also expected, the expense trigger 138 identifies an expense for the return travel. For example, if an employee's corporate card is authorized for a taxi to an airport (e.g., as determined by the transaction authorization data processing engine 117 evaluating a transaction authorization data stream received from the card issuer 107 via the card issuer interface 106), an expense trigger 138 may identify (e.g., based on an expense pattern 137 for business travel), a corresponding expense for return travel from the airport. As another example, if an employee's corporate card is authorized for airfare to a travel destination and a hotel stay at the travel destination, an expense trigger 138 may identify corresponding expenses for local travel to and from both home airport and destination airport. Using historical expense data 130 and user data such as calendar data obtained via the external data source 146, an expense trigger 138 may estimate predicted expense amounts for the local travel, hotel stay, and meal expenses associated with the travel for which the airfare and hotel transactions were authorized. These estimated predicted expense amounts may update expense report generation criteria 136 associated with the predicted expenses such that when transaction authorization data reasonably close to the predicted expense amounts is processed by the transaction authorization data processing engine 118, an expense report associated with the transaction authorization data processing engine 118 may be generated by the expense report generation engine 114 without or with minimal user input; whereas when transaction authorization data significantly different from the predicted expense amounts is processed by the transaction authorization data processing engine 118, an expense report associated with the transaction authorization data processing engine 118 may require significant user input and feedback to reconcile the difference prior to the expense report being generated by the expense report generation engine 114. These estimated predicted expense amounts may facilitate more accurate predicted travel expense budgets, improved tracking of travel expenses during business travel, and more streamlined expense report generation in response to received transaction authorization data.

For example, when a transaction authorization data indicates it is a hotel booking authorization, the transaction authorization data itself may not have enough information to accurately estimate the final hotel charge when the employee checks out. However, the employee's calendar data accessible as an external data source 146 may specify both the check in date and the check out date for the hotel. Also, there may be airfare booking data corresponding to the timeframe of the hotel booking authorization stored in the data repository 128, for example, in association with another generated expense report. There may also be corresponding airfare booking data in the employee's calendar data. Based on contextual data such as this, the expense reporting service 112 may determine how many days the employee may be staying at the hotel as early as the first transaction authorization data is received and/or when the employee checks into the hotel and the expense reporting service 112 receives a transaction authorization data set corresponding to the hotel check-in. the expense reporting service 112 may estimate a predicted total hotel bill based on various other contextual information, such as the typical price per night paid for the hotel, including taxes and fees, and historical expense data 130 associated with the employee to see whether the employee typically charges incidentals and meals to the room or not, and what those amounts typically amount to on a per-night basis. When the employee charges items to the room, the hotel may increase the hold placed on the card and the expense reporting service 112 may receive an updated authorization with the increased hold amount. This information may also be used to update the estimated final hotel charge and increase the accuracy of the generated expense report. A predicted range of final hotel charge amounts may be determined using the contextual data prior to the final hotel charge being authorized and provided in a final transaction authorization data set prior to settlement. The predicted range may be used to pre-approve the generated expense report according to corporate expense policies and guidelines, and if the final transaction authorization data set prior to settlement is within the pre-approved range, the employee may not need to review the generated expense report prior to submission.

In some embodiments, an expense trigger 138 associated with a given employee is based, at least in part, on one or more expense reports generated by or on behalf of one or more other employees who are traveling with the given employee. In one example, three employees are participating in the same business trip and expense reports are generated by the expense report generation engine 114 for two of the employees for a business meal at a particular restaurant based on the transaction authorization data processing engine 118 processing of transaction authorization data received from the card issuer 107 via the card issuer interface 106. In this example, an expense trigger 138 may identify that a corresponding expense at the same restaurant may also apply to the third employee (e.g., who may have paid by cash or charged the meal to the hotel room instead of by using the corporate card).

In some embodiments, an expense trigger 138 is based, at least in part, on one or more transaction authorization data items and/or transaction settlement data items associated with a transaction made by one or more employees and processed by the transaction authorization data processing engine 118 and/or transaction settlement data processing engine 119 after being received from the card issuer 107 via the card issuer interface 106. The expense trigger 138 may determine that a particular transaction is associated (e.g., corresponds in time and/or geographic location) with an employee's relevant activity (e.g., based on the employee's calendar as received from the external data source 146). Based on the association between the transaction and the employee's targeted activity, the expense trigger 138 may identify the transaction as a potentially eligible business expense (e.g., if made using the employee's corporate card) or reimbursable expense (e.g., if made using the employee's personal card).

In some embodiments, an expense trigger 138 is based, at least in part, on a typical and/or expected pairing between two or more different kinds of expenses. In one example, an employee purchases gas at a gas station using a corporate card, and associated transaction authorization data is received and processed by the transaction authorization data processing engine 118. However, the employee has not made a transaction on a corporate card or personal card registered to the expense reporting service 112 for a car rental, so no expense data associated with a car rented by the employee has been processed or stored by the expense reporting service 112. Based on a typical and expected pairing between gasoline and car rental, an expense trigger 138 may identify a car rental as an available expense for the employee. The expense trigger 138 may prompt the employee to manually enter information about a car rental expense or indicate that the employee will not have a car rental expense. The expense trigger 138 may use contextual information obtained from an external data source 146 and/or other expense reports generated by the expense report generation engine 114 to reconcile the employee's gas purchase transaction. For example, the contextual information may show that the employee is traveling with another employee, and the other employee has rented a car. The expense trigger 138 may use this contextual information, optionally with some confirmation by the employee in response to query prompts, to associate the employee's gas purchase transaction with the other employee's car rental transaction for which an expense report has been or is being generated by the expense report generation engine 114, on behalf of the other employee.

In some embodiments, an expense trigger 138 identifies similar expenses over time and identifies an opportunity to automatically enter data into an expense report generated by the expense report generation engine 114 based on data entered into a previous occurrence of the recurring expense, instead of prompting the employee for the data each time the expense is incurred. As one example, an employee who travels frequently for business each month has recurring transactions each month including expenses corresponding to an international data roaming plan. An expense trigger 138 may identify the international data roaming plan as a recurring expense. Based on identifying the international data roaming plan as a recurring expense, the expense report generation engine 114 may include data provided by the user describing the data roaming plan expense in response to the transaction authorization data processing engine 118 processing transaction authorization data associated with the data roaming plan, so that the employee does not need to enter the description for the recurring expense each month.

Many different kinds of expense triggers 138 may be defined. In an embodiment, an expense reporting service 112 uses a machine learning engine 124 to determine an expense trigger 138 as part of a machine learning model 126. Machine learning engine 124 is operable to automatically infer expense triggers even though the exact pattern may not have been seen before. Further, machine learning engine 124 is operable to learn different patterns of behavior that qualify as an expense trigger 138 depending on context. For example, expense triggers may differ depending on employee attributes, such as employee title, clearance level, job responsibilities. Additionally or alternatively, expense triggers may vary between different groups of employees, such as between different companies or organizational departments within the same company. Additionally or alternatively, expense triggers may vary for different temporal patterns, and/or geographic patterns of incurred expenses.

In some embodiments, a data repository 128 is configured to store one or more expected expense triggers 139. An expected expense trigger 139 is a codified set of rules and/or a set of automatically learned patterns that capture one or more conditions for identifying expected expenses that are known or expected to be permissible (e.g., if charged to a corporate card) or reimbursable (e.g., if charged to a personal card). An expected expense may be an expense that the employee has not yet incurred. An expected expense may be an expense that the employee is in the process of incurring or is associated with a transaction authorization that has not yet settled. In some embodiments, an expense reporting service 112 uses a machine learning engine 124 to determine an expected expense trigger 139 as part of a machine learning model 126.

In some embodiments, an expected expense trigger 139 is based, at least in part, on data corresponding to target activity of an employee and/or historical expense data 130. For example, an expected expense trigger 139 may recommend less expensive spending options to an employee who has a tendency to spend above expense limits and/or above expense guidelines. As another example, an expected expense trigger 139 may recommend expenses that are popular among similarly situated employees, such as a particular restaurant that other employees have frequented and for which expenses tended to be allowed or reimbursed. As another example, an expected expense trigger 139 may recommend against frequenting a particular establishment for which expenses tended to be billed back to the employee as a personal expense or declined for reimbursement.

In some embodiments, an expected expense trigger 139 is based, at least in part, on one or more expense preferences 131. For example, an expected expense trigger 139 may identify a recommended restaurant for an employee who is vegan or who is meeting with a client who is vegan. As another example, an expected expense trigger 139 may identify a recommended restaurant or mode of transportation for an employee who prefers healthy options.

In some embodiments, expected expense trigger 139 is based, at least in part, on an expense policy 132 and/or an expense guideline 133. For example, an expected expense trigger 139 may identify recommended expenses that increase responsible spending behavior, for example by reducing spending, taking advantage of deals, earning rewards, etc.

In some embodiments, an expected expense trigger 139 is based, at least in part, on a determination that one expense is less expensive and/or more likely to be allowable or reimbursable than another expense. Recommending less expensive options may reduce expenses for an organization and decrease the incidence of expenses that need to be handled with user intervention in an expense report generation process based on transaction authorization data processing when or after the expense is incurred, need to be audited, are billed back to the employee as personal expenses, and/or are declined for reimbursement.

In some embodiments, an expected expense trigger 139 is based, at least in part, on an employee's spending score. An employee's spending score may be based, at least in part, on historical expense data 130 associated with the employee. For example, the employee spending score may be based on one or more of: whether the employee tends to be below spending limits; an average time that the employee takes to prepare expense descriptions for transaction authorizations and/or transaction settlements; an audit history of the employee (e.g., a history of allowed and/or rejected expense descriptions, which may be expressed as a ratio or some other metric); a comparison of the employee's past spending with a expense policy (e.g., a spending limit); and/or any other kind of data or combination thereof associated with the employee's spending. In some embodiments, employees with 'better' spending scores are at lower risk of audits than employees with 'worse' spending scores. An expected expense trigger 139 may identify and steer employees toward less expensive options for employees with 'worse' spending scores than for employees with 'better' spending scores.

In some embodiments, an expected expense trigger 139 is based on one or more attributes of past, present, and/or planned target activity of an employee (e.g., a business trip or another kind of business-related activity). For example, trips of at least a threshold duration may qualify for certain allowable or reimbursable expenses (e.g., dry cleaning). As another example, flights of at least a threshold duration may qualify for an allowable or reimbursable seat upgrade. As another example, travel to international destinations may qualify for allowable or reimbursable international data roaming charges.

In some embodiments, an expected expense trigger 139 is based, at least in part, on an expense limit for a trip compared with an amount of expenses already incurred for the trip. For example, an expected expense trigger 139 may identify recommended options for expected expenses that are less expensive than other options, for an employee who is running out of expense budget on a trip. The expected expense trigger 139 may compare a remaining budget with a remaining time on the trip and recommend options for expected expenses that allocate the remaining budget across the remaining time.

In some embodiments, an expected expense trigger 139 is based, at least in part, on information about employees who are participating in the same target activities. For example, an expected expense trigger 139 may identify ride-sharing and/or other expense sharing opportunities for employees traveling to the same destination. The system 100 may present the recommended options for an expected expense to one or more of those employees, to help encourage savings available by sharing expenses.

In some embodiments, an expected expense trigger 139 is based, at least in part, on transaction authorization data (e.g., a type of merchant, product, or service; an identification of the merchant, product or service). For example, if the transaction authorization data specifies that the merchant is a restaurant, an expected expense trigger 139 may indicate that the final charge associated with the transaction authorization data is expected to be larger to account for a tip to be added after the initial authorization. As another example, if the transaction authorization data specifies that the merchant is a hotel, an expected expense trigger 139 may indicate that the final charge associated with the transaction authorization data is expected to be larger to account for the full length of the hotel stay plus any room charges such as room service, restaurant room charges, activity fees, parking fees, etc. As another example, if the transaction authorization data specifies that the merchant is a gas station, an expected expense trigger 139 may indicate that the final charge associated with the transaction authorization data is expected to be different based on an amount of gas finished pumping into a vehicle's gas tank.

In some embodiments, the expected expense trigger 139 accounts for the likelihood that the most recently processed transaction authorization data includes the final transaction amount even though not settled. For example, a first transaction authorization data received for a restaurant, gas station, or hotel charge may be considered to have a low probability of being for the final amount, while a second transaction authorization data received for a restaurant, gas station, or hotel charge may be considered to have a high probability of being for the final amount, even if the transaction has not yet settled. The expected expense trigger 139 may be useful for triggering a notification to the employee and request for information about a final transaction amount and/or other information for generating an expense report in situations where it is expected that an initial transaction authorization data may not include a final transaction amount, but subsequent updated transaction authorization data received may include a final transaction amount, even though the transaction has not yet settled.

In some embodiments, an expected expense trigger 139 is based on determining a likelihood that an expense associated with received transaction authorization data is a personal expense vs. an eligible business expense. The likelihood may impact whether the employee is queried regarding categorization of the expense as a personal expense vs. eligible business expense, or whether the system assumes that the categorization of the expense determined by the system is correct and proceeds to generate, or refrain from generating, the expense report associated with the transaction authorization data.

In some embodiments, a data repository 128 is configured to store one or more approval triggers 140. An approval trigger 140 is a codified set of rules and/or a set of automatically learned patterns that capture one or more conditions for requiring review and/or approval of an expense description and/or expense report before submitting the expense description and/or expense report. An approval trigger 140 may be based, at least in part, on data corresponding to target activity of an employee, transaction authorization data 134, and/or historical expense data 130. For example, an approval trigger 140 may indicate that an expense description requires review and/or approval if the expense exceeds or is within a certain amount of an expense limit. As another example, an approval trigger 140 may indicate that all expense descriptions in a particular category, and/or all expense descriptions prepared for a particular employee, require review and/or approval. As another example, expense descriptions that violate an expense policy 132 and/or an expense guideline 133 may require review and/or approval. As another example, employees themselves may be required to review and/or approve expense descriptions that are generated by the expense reporting service 112 in a user-independent mode (e.g., based on an expense trigger 138). Many different kinds of approval triggers 140 may be defined. In some embodiments, an expense reporting service 112 uses a machine learning engine 124 to determine an approval trigger 140 as part of a machine learning model 126.

In some embodiments, a data repository 128 is configured to store one or more audit triggers 142. An audit trigger 142 is a codified set of rules and/or a set of automatically learned patterns that capture one or more conditions for requiring auditing of an expense report, and/or for determining that an expense report or description is at risk of being audited. An audit trigger 142 may be based, at least in part, on data corresponding to target activity of an employee, transaction authorization data 134, transaction settlement data 135, and/or historical expense data 130. In some embodiments, an audit trigger 142 is based, at least in part, on an audit risk score associated with a particular expense description. An audit trigger 142 may be satisfied when an audit risk score satisfies one or more threshold criteria (e.g., the audit risk score may be above or below a threshold number, or any other kind of threshold criteria or combination thereof). In some embodiments, an expense reporting service 112 uses a machine learning engine 124 to determine an audit trigger 142 as part of a machine learning model 126.

In some embodiments, a data repository 128 is configured to store one or more user credentials 144. An expense reporting service 112 may use a user credential 144 to access an external data source 146 and obtain data from the external data source 146. A user credential 144 may include a username, user identifier (ID), password, private key, public key, and/or any other kind of credential or combination thereof. In some embodiments, an employee supplies a user credential 144 to an expense reporting service 112 via a graphical user interface. For example, the expense reporting service 112 may use three-party authentication to obtain a user credential 144 from an employee.

In some embodiments, user data that is input into machine learning engine 124 is anonymized. Personal identifying information (PII) and other sensitive information may be replaced with an anonymous identifier, such as a cryptographic hash of the user data. Machine learning engine 124 may use the anonymized data to learn patterns and make predictions for different employees, within the same or different organizations, having similar attributes without compromising or revealing sensitive employee data.

Information describing one or more components that are illustrated here within a data repository 128 may be implemented across any one or more components within the system 100. However, this information is illustrated within the data repository 128 for purposes of clarity and explanation.

In some embodiments, an expense reporting service 112 is configured to receive data from one or more external data sources 146. An external data source 146 refers to hardware and/or software operating independent of the expense reporting service 112, i.e., under control of a different entity (e.g., a different company or other kind of organization) than an entity that controls the expense reporting service 112. An external data source 146 may supply data associated with an employee's business-related activity, such as travel, dining, meals, itineraries, appointments, emails, phone data, social media messages, credit card statements (e.g., for a business-provided credit card), and/or any other kind of target activity or combination thereof. The data may include information associated with an employee's expenses, which may or may not be allowable or reimbursable.

Some examples of an external data source 146 supplying data to an expense reporting service 112 include, but are not limited to: an airline or travel agency supplying data associated with an itinerary and/or ticket purchase; a food ordering application supplying data associated with a food order; a ride sharing service (e.g., Uber™, Lyft™, or another ride sharing service) supplying data associated with an instance of ride sharing; and a social media application (e.g., Facebook™, Foursquare™, or another social media application) supplying data corresponding to a check-in at a location (e.g., a restaurant, hotel, entertainment venue, or other location). Many different kinds of external data sources 146 may supply many different kinds of data.

In some embodiments, an expense reporting service 112 is configured to retrieve data from an external data source 146 by 'pulling' the data via an application programming interface (API) of the external data source 146, using user credentials 144 that a user has provided for that particular external data source 146. Alternatively or additionally, an external data source 146 may be configured to 'push' data to the expense reporting service 112 via an API of the expense reporting service, using an access key, password, and/or other kind of credential that a user has supplied to the external data source 146. Alternatively or additionally, an external data source 146 may be configured to access data from an additional external data source to provide to the expense reporting service 112 via an API of the external data sourced 146, using an access key, password, and/or other kind of credential that a user has supplied to the external data source 146. An expense reporting service 112 may be configured to receive data from an external data source 146 in many different ways.

In some embodiments, a reimbursement service 148 refers to hardware and/or software configured to perform operations for reimbursing approved expenses paid by an employee, e.g., via a charge to the employee's personal card, paying the card issuer 107 of a corporate card for approved expenses charged to the corporate card, and/or for billing the employee for payment by the employee of personal and/or disallowed expenses charged to the corporate card. For example, the reimbursement service 148 may be part of an accounting service that includes paying bills for the corporate card, invoicing employees for payment of personal expenses charged to the corporate card, and/or applying reimbursements for approved expenses to employee's paychecks and/or separate reimbursement checks, which may be mailed to employees and/or direct-deposited into employee's bank accounts. Many different techniques for paying for or reimbursing approved expenses as well as invoicing employees for payment of disallowed expenses exist. The expense reporting service 112 may automatically submit generated expense reports that have acceptable and adequate policy justifications to the reimbursement service 148 on the employee's preferred day of submission.

In some embodiments, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating an Expense Report Based on Transaction Authorization Data

Figure 2B:
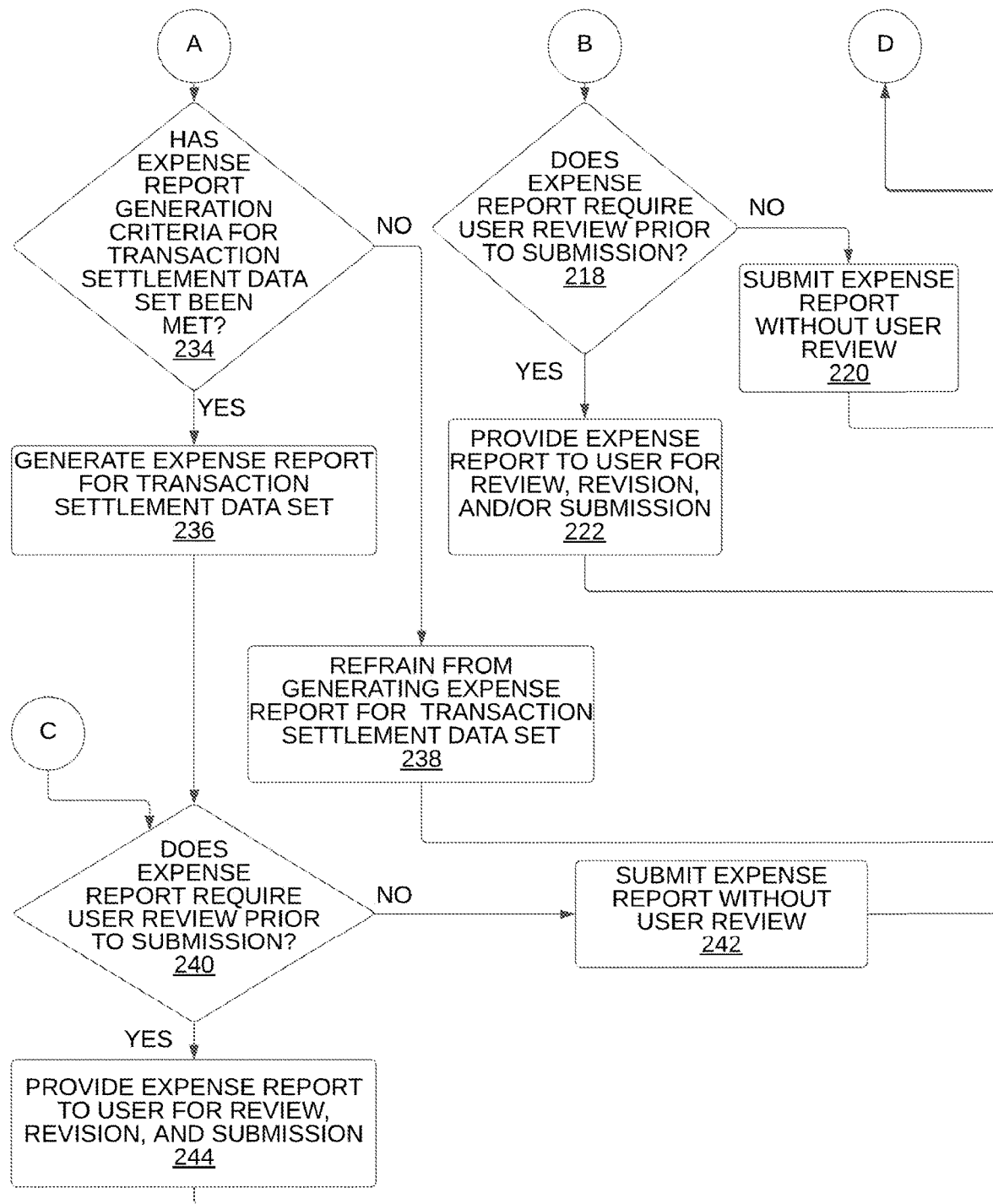

FIGS. 2A and 2B illustrate an example set of operations for generating an expense report based on transaction authorization data in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

In some embodiments, a system (e.g., one or more components of system 100 illustrated in FIG. 1) monitors a transaction authorization data stream (Operation 202). Specifically, the system (e.g., expense reporting service 112) monitors a data stream including transaction authorization data coming from a financial institution (e.g., card issuer 107) that authorizes financial transactions that may be included in expense reports (e.g., generated by expense reporting service 112).

The monitored transaction authorization data stream may include duplicates of transaction authorization data sent by the financial institution to the merchant (e.g., merchant+POS terminals 109) after the merchant attempts to process a transaction involving a financial account (e.g., a credit card or a debit card) of the financial institution. Each transaction authorization data set corresponding to an authorized transaction may be a result of a series of operations involving the financial institution and the merchant, as well as a financial network to which both are connected (e.g., processor+card network 108). For example, an employee may initiate a financial transaction at the merchant by swiping the employee's corporate card or personal card using the merchant's POS terminal (e.g., merchant+POS terminals 109). The merchant may transmit data pertaining to the employee's initiated financial transaction to the financial institution (e.g., card issuer 107) via a financial network (e.g., processor+card network 108) to request approval for the financial transaction. The financial institution may process the request to approve the financial transaction and send an approval code to the merchant (e.g., merchant+POS terminals 109) via the financial network (e.g., processor+card network 108). For financial accounts (e.g., corporate cards and/or personal cards) registered with the system for generating expense reports (e.g., expense reporting service 112), the financial institution (e.g., card issuer 107) may also send the approval code and other financial transaction authorization data associated with the approved financial transaction to the system (e.g., via the card issuer interface 106). The merchant may send an updated and/or final transaction data in association with the approved financial transaction to the financial institution via the financial network. For example, an authorized financial transaction for a restaurant bill may be for an amount not including tip, including an estimated tip, or including a larger than typical tip amount. After the diner completes the transaction with the restaurant including tip amount, the restaurant may send an updated and/or final transaction data in association with the approved financial transaction to the financial institution that includes the actual tip amount indicated by the diner. As another example, an authorized financial transaction for gasoline made at a gasoline pump of a service station may be for an amount equivalent to or larger than a typical fill-up. After the customer completes filling their gas tank, the service station may send an updated and/or final transaction data in association with the approved financial transaction to the financial institution that includes the charge amount based on the final amount of gasoline pumped by the customer. As another example, an authorized financial transaction for a room booked at a hotel may be for an amount equivalent to one night stay regardless of the number of nights booked, for an amount equivalent to the entire booked stay, for an amount equivalent to the entire booked stay plus estimated additional room charges for room service, amenities, parking fees, restaurants, or other amounts. After the checks out of the hotel, the hotel may send an updated and/or final transaction data in association with the approved financial transaction to the financial institution that includes the charge amount based on the final number of nights stayed and other room charges the guest may have made. The financial institution may place a hold on the financial account to prevent additional charges that may cause the financial account to go over its charge limit when the final charge amount of the amount placed on hold or less is provided by the merchant.

In some embodiments, the system identifies a transaction authorization data set that may be processed by the system (e.g., by the expense reporting service 112) (Operation 204). A transaction authorization data set that may be processed may be associated with a financial account or card (e.g., corporate card, personal card) that is registered for use with the system (e.g., registered in the issued card data 129 and/or the data repository 128). A transaction authorization data set that may be processed may be associated with an authorized transaction. A transaction authorization data set that may be processed may be not associated with a notification that an attempted transaction was declined and not authorized, unless the transaction authorization data set is a revision to or update of a previously processed transaction authorization data set. A transaction authorization data set may be for a new transaction or an update or revision of an already received and/or processed transaction authorization data set, for example, after the employee has extended their stay at a hotel. The system may process revised or updated transaction authorization data in a manner similar to originally processed transaction authorization data, except that old transaction authorization data may be replaced by or merged with the revised or updated transaction authorization data. The system may keep a log of multiple received and processed transaction authorization data sets (e.g., transaction authorization data 134 of the data repository 128), including one or more of those later replaced or updated with a revised transaction authorization data set.

In some embodiments, after the system identifies a transaction authorization data set that may be processed, the system compares the transaction authorization data to expense report generation criteria (e.g., stored in expense report generation criteria 136) (Operation 206). Expense report generation criteria may vary according to different employees, different financial accounts (e.g., issued card data 129), different types of merchants, different types of products or services associated with the transaction authorization data, historical expense data 130, or other factors.

In some embodiments, after the system has evaluated the transaction authorization data according to the expense report generation criteria, the system makes a determination, based upon the evaluation, whether the expense report generation criteria for the transaction authorization data set has been satisfied (Operation 208). If the expense report generation criteria is determined to not have been satisfied, the system may refrain from generating an expense report for the transaction authorization data set (Operation 210) and continue monitoring the transaction authorization data stream.

In some embodiments, if the expense report generation criteria for transaction authorization data is determined to have been satisfied, the system (e.g., expense report generation engine 114) generates an expense report for the transaction authorization data set (Operation 212).

In some embodiments, after the expense report for the transaction authorization data has been generated, the system makes a determination regarding whether the generated expense report requires user review prior to submission (Operation 218). The system may evaluate the transaction authorization data 134, information pertaining to the user for whom the expense report was generated, historical expense data 130, expense preferences 131, expense policies 132, expense guidelines, 133, and/or other data stored in the data repository 128 or accessible from the external data source 146 in making this determination. The system may also determine whether the user should be notified regarding the generated expense report. These determinations may be based on data regarding the user's historical patterns of reviewing and/or taking other actions based on notifications from the system. These determinations may be based on other factors associated with the user and/or the transaction authorization data 134 included in the generated expense report. For example, the determinations may be based on the user's location, the user's availability, the user's preferences, the user's calendar schedule, the dollar value of the expenditure(s) in the expense report, importance level assigned to the expense report; factors associated with transaction authorization data 134 included in the expense report, whether the transaction authorization data 134 included in the expense report includes an update to previously existing transaction authorization data 134, whether transaction settlement data 135 corresponding to the transaction authorization data 134 has been received, etc.

For example, the system may determine that user review prior to submission is not required if the user has not exceeded the user's authorized expense budget when the currently generated expense report is factored in, if the system already has all data necessary for the expense report, and if the expense report follows all expense policies 132 and expense guidelines 133. The system may provide a notification to the user (e.g., via the submitter interface 102) that the expense report has been generated and query the user regarding whether the user wishes to review and edit the expense report prior to submission, and include the user's response to the query in the factors for making the determination. The system may notify the user that the generated expense report will be submitted within a certain time period unless the user requests to view and/or revise the generated expense report prior to submission, and include the user's actions within the given time period in making the determination. The system may include other factors or a different combination of factors when performing the evaluation and making the determination.

In some embodiments, the system may determine whether the current time or a different time is the best time to provide a notification to the user. The system may determine whether additional events should be collected without separate notifications to the user prior to providing the user a notification that includes information regarding multiple different events. The system may make the determination on user notification timing based on various factors, for example:

- whether all details for the system to include with expense data in the expense report to support the expenditure in the expense report have been provided to the system;
- whether all relevant data received from various sources for a given expenditure has been matched to the expenditure to facilitate the system completing the expense report for the expenditure without user queries or involvement;
- whether the expense has been validated and the system has determined that further information is required from the user in order to complete the corresponding expense report;
- whether the system should wait for additional data sources to provide information relevant to the expense (e.g., receipts) and extract further details from the data sources' information prior to presenting data to the user for review or requesting additional information from the user;
- the user's typical responsiveness and timing on responding to a query for information or to review data (e.g., immediate action, wait until end of day, etc.);
- which time zone the user is located in; and whether the user is currently working, on vacation, sleeping, in a meeting, or otherwise determined to be either currently available or unavailable to act on a notification.

In some embodiments, after the determination is made that the expense report does not require user review prior to submission, the system submits the expense report without user review (Operation 220). For example, the expense reporting service 112 may submit the expense report (e.g., generated by the expense report generation engine 114) to the reimbursement service 148. The system may notify the user that the generated expense report has been submitted (e.g., via the submitter interface 102). The system may notify the user that the generated expense report will be submitted within a certain time period after the notification. The system may submit the expense report without notifying the user immediately after generating the expense report and determining that user review is not required, or after a certain time period after generating the expense report and determining that user review is not required. The certain time period after generating the expense report may be based upon various factors associated with the transaction authorization data and/or the user, such as the type of expense, the amount of the expense, historical expense data 130, expense preferences 131, expense policies 132, expense guidelines 133, how close the user may be to an expense limit to which the user is subject, whether another related expense is expected or in process, and/or other combinations of factors. After submission of the generated expense report, the system may continue monitoring the transaction authorization data stream.

In some embodiments, if the system determines that the generated expense report for the transaction authorization data does require user review prior to submission, the system provides the generated expense report to the user (e.g., via the submitter interface 102) for review, revision, updating, and/or authorization for submission (Operation 222). The generated expense report may be provided for review and the user may be queried for feedback and authorization for submission via the submitter interface 102. The user may provide additional data such as scanned documents (e.g., receipts), photographs (e.g., fellow employees at dinner together) via an input device associated with the submitter interface 102, for example, a camera or a scanner 104. The system may prevent the user from editing, deleting, changing, or revising any transaction authorization data received from the card issuer 107. The system may revise the generated expense report according to the user's review and revisions, check that the revised generated expense report meets various requirements for submission (e.g., according to the expense preferences 131, expense policies 132, expense guidelines 133, etc.), and then submit (e.g., to the reimbursement service 148) the reviewed/revised expense report after the user reviews the submission (e.g., via the submitter interface 102).

In some embodiments, the system monitors a transaction settlement data stream (Operation 224). Specifically, the system (e.g., expense reporting service 112) monitors a data stream including transaction settlement data coming from a financial institution (e.g., card issuer 107) that processes financial transactions that may be included in expense reports (e.g., generated by expense reporting service 112).

The monitored transaction settlement data stream may include data pertaining to transaction authorization data sent by the financial institution to the merchant (e.g., merchant+POS terminals 109) after the merchant attempts to process a transaction involving a financial account (e.g., a credit card or a debit card) of the financial institution, final charge data provided by the merchant including final charged amounts, an authorization reference code identifying the prior transaction authorization data set(s), and/or other data associated with the settled financial transaction.

In some embodiments, the system identifies a transaction settlement data set that may be processed by the system (e.g., by the expense reporting service 112) (Operation 226).

A transaction settlement data set that may be processed may be associated with a financial account or card (e.g., corporate card, personal card) that is registered for use with the system (e.g., registered in the issued card data 129 and/or the data repository 128). A transaction settlement data set that may be processed may be associated with a previously authorized transaction.

In some embodiments, after the system identifies a transaction settlement data set that may be processed, the system determines if an expense report has been generated (and is still active and available) based on associated transaction authorization data (Operation 228). In some embodiments, an expense report generated based on associated transaction authorization data may not exist either because it didn't meet various expense report generation criteria or a time period between when the expense report of the transaction authorization data set was generated and when the associated transaction settlement data set indicating that the authorized transaction has settled is too long, in which case the generated transaction authorization expense report may have been deleted from the system.

In some embodiments, after the system determines that the expense report based on the transaction authorization data associated with the transaction settlement data has been generated and is available to the system, the system updates the previously generated expense report (Operation 230). The system may update the previously generated expense report if the previously generated expense report has not been submitted already. The system may update the previously generated expense report if the previously generated expense report has been submitted already. The system may notify or query the user for any additional information, clarifications, reviews, approvals, or other input needed from the user in order to update the previously generated expense report based on the transaction settlement data.

In some embodiments, after the system determines that the expense report based on the transaction authorization data associated with the transaction settlement data has not been generated or is not presently available to the system, the system compares the transaction settlement data to expense report generation criteria (e.g., stored in expense report generation criteria 136) (Operation 232). Expense report generation criteria may vary according to different employees, different financial accounts (e.g., issued card data 129), different types of merchants, different types of products or services associated with the transaction authorization data, historical expense data 130, whether the expense report is being generated based on transaction authorization data or transaction settlement data, or other factors.

In some embodiments, after the system has evaluated the transaction settlement data according to the expense report generation criteria, the system makes a determination, based upon the evaluation, whether the expense report generation criteria for the transaction settlement data set has been satisfied (Operation 234). If the expense report generation criteria is determined to not have been satisfied, the system may refrain from generating an expense report for the transaction settlement data set (Operation 238) and continue monitoring the transaction settlement data stream.

In some embodiments, if the expense report generation criteria for transaction settlement data is determined to have been satisfied, the system (e.g., expense report generation engine 114) generates an expense report for the transaction settlement data set (Operation 236).

In some embodiments, after the expense report for the transaction settlement data has been generated or a previously generated transaction authorization expense report has been updated based on the transaction settlement data (e.g., to become equivalent to a transaction settlement data expense report), the system makes a determination regarding whether the generated expense report requires user review prior to submission (Operation 240). The system may evaluate the transaction authorization data 134, transaction settlement data 135, information pertaining to the employee for whom the expense report was generated, historical expense data 130, expense preferences 131, expense policies 132, expense guidelines 133, and/or other data stored in the data repository 128 or accessible from the external data source 146 in making this determination. For example, the system may determine that user review prior to submission is not required if the employee has not exceeded the employee's authorized expense budget when the currently generated expense report is factored in, if the system already has all data necessary for the expense report, and if the expense report follows all expense policies 132 and expense guidelines 133. The system may provide a notification to the user (e.g., via the submitter interface 102, an SMS message, an instant message (IM), an email, or other electronic communication means) that the expense report has been generated and query the user if the user wishes to review and edit the expense report prior to submission, and include the user's response to the query in the factors for making the determination. The system may notify the user that the generated expense report will be submitted within a certain time period unless the user requests to review and/or revise the generated expense report prior to submission, and include the user's actions within the given time period in making the determination. The system may include other factors or a different combination of factors when performing the evaluation and making the determination.

In some embodiments, after the determination is made that the generated or revised expense report does not require user review prior to submission, the system submits the expense report without user review (Operation 242). For example, the expense reporting service 112 may submit the expense report (e.g., generated by the expense report generation engine 114) to the reimbursement service 148. The system may notify the user that the generated expense report has been submitted (e.g., via the submitter interface 102, SMS message, IM, email, or other electronic communications means). The system may notify the user that the generated expense report will be submitted within a certain time period after the notification. The system may submit the expense report without notifying the user immediately after generating the expense report and determining that user review is not required, or after a certain time period after generating the expense report and determining that user review is not required. The certain time period after generating the expense report may be based upon various factors associated with the transaction settlement data, associated transaction authorization data, and/or the employee, such as the type of expense, the amount of the expense, historical expense data 130, expense preferences 131, expense policies 132, expense guidelines 133, how close the employee may be to an expense limit to which the employee is subject, whether another related expense is expected or in process, and/or other combinations of factors. After submission of the generated expense report, the system may continue monitoring the transaction settlement data stream.

In some embodiments, if the system determines that the generated expense report for the transaction authorization data does require user review prior to submission, the system provides the generated expense report to the user (e.g., via the submitter interface 102, SMS message, IM, email, or other electronic communication) for review, revision, updating, and/or authorization for submission (Operation 244). The generated expense report may be provided for review and the user may be queried for feedback and authorization for submission via the submitter interface 102. The user may provide additional data such as scanned documents (e.g., receipts), photographs (e.g., fellow employees at dinner together) via an input device associated with the submitter interface 102, for example, a camera or a scanner 104. The system may prevent the user from editing, deleting, changing, or revising any transaction settlement data (or transaction authorization data) received from the card issuer 107. The system may revise the generated expense report according to the user's review and revisions, check that the revised generated expense report meets various requirements for submission (e.g., according to the expense preferences 131, expense policies 132, expense guidelines 133, etc.), and then submit (e.g., to the reimbursement service 148) the reviewed/revised expense report after the user reviews the submission (e.g., via the submitter interface 102).

In some embodiments, after an expense report has been generated for a transaction authorization data set, the system may determine based upon a time elapsed since the expense report has been generated (and/or update based on an updated transaction authorization data set) and the monitoring of transaction settlement data stream whether the authorized transaction of the transaction authorization data set of the generated expense report has been settled within a threshold period of time (Operation 250). The threshold period of time may be measured from the original transaction authorization, the latest updated transaction authorization data set received, or based on a formula involving the original transaction authorization and one or more subsequent updates to the transaction authorization. The threshold period of time may also be based on one or more other factors of the transaction authorization data 134 (e.g., merchant type, expense type, authorized amount, etc.), historical expense data 130, expense preferences 131, expense policies 132, expense guidelines 133, expense patterns 137, employee's contextual data pertaining to the transaction authorization (e.g., employee's calendar accessible via an external data source 146), and/or other data accessible by the system. Whether the previously generated expense report based on the transaction authorization data has already been submitted may affect the threshold period of time used for the determination. The system may cease making this determination after the authorized transaction is determined to have been settled, and the system may continue monitoring the transaction authorization data stream and transaction settlement data stream.

In some embodiments, the system may remove the previously generated expense report based on the transaction authorization data (Operation 252) if the authorized transaction has been determined to not have settled within the threshold period of time. In situations where the previously generated expense report has already been submitted (e.g., to the reimbursement service 148), the system may contact the reimbursement service 148 to cancel or withdraw the previously generated expense report. The system may remove transaction authorization data 134 from the data repository 128 if corresponding transaction settlement data 135 has not been received within the threshold period of time and/or the corresponding merchant has not finalized the corresponding transaction within the threshold period of time. The threshold period of time may include one or more days, for example, two days, three days, four days, five days, six days, or seven days, or other time period, for example.

4. Integrating Machine Learning into Expense Processing

In some embodiments, the expense reporting service 112 leverages machine learning to facilitate and automate processes for generating expense reports based on transaction authorization data when the authorized transactions have not yet settled. Machine learning facilitates the expense reporting service 112 to perform tasks and capture patterns that are not hard-coded or otherwise explicitly programmed into the system. Machine learning further allows the expense reporting service 112 to adapt to different application use-cases and evolve over time without requiring complex reprogramming or other changes in the underlying application code.

Figure 3:
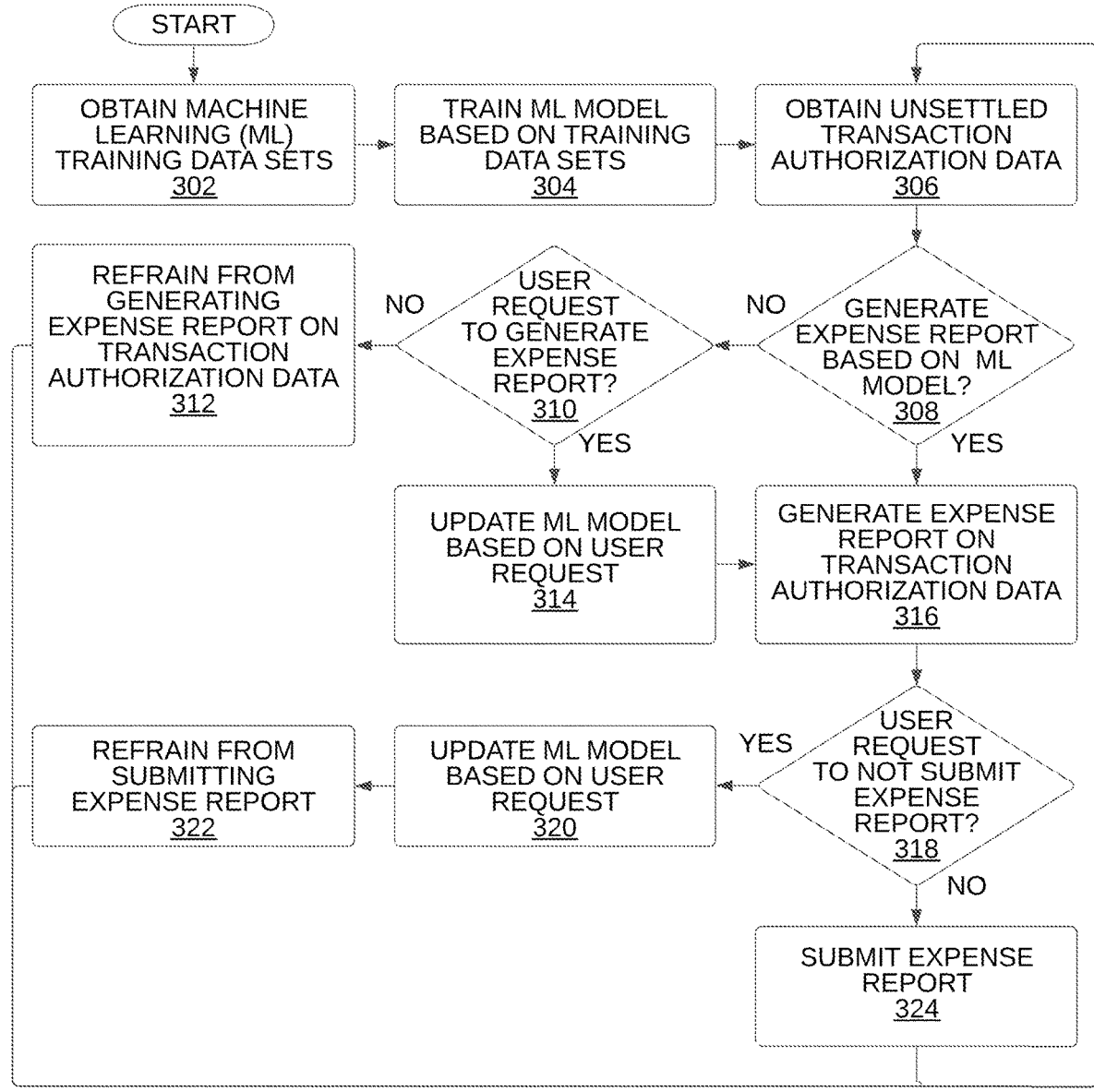
FIG. 3 illustrates an example set of operations for training a machine learning model to generate an expense report based on transaction authorization data in accordance with one or more embodiments.

FIG. 3 illustrates an example set of operations for training a machine learning model (e.g., machine learning model 126) to generate expense reports based on transaction authorization data for transactions that have not yet settled, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In some embodiments, a plurality of data sets for training a machine learning (ML) model (e.g., ML model 126 illustrated in FIG. 1) of a system (e.g., system 100 illustrated in FIG. 1) are obtained (Operation 302). The plurality of training data sets may include: (a) transaction authorization data for a particular transaction in an authorized pre-settlement state, and (b) a label or indication of whether an expense report is to be generated for the particular transaction. In some embodiments, examples in the training data sets include multiple expenses and/or activities that are related. For instance, a single example may include a set of expenses and/or activities that were incurred by an employee on a single business trip. In this instance, the expenses and activities may be related (a) temporally since the expenses are likely to have occurred within a relatively short timeframe of the trip; (b) geographically since the trip was likely constrained to a limited number of locations; and (c) by entity since the expenses were incurred by the same employee. The training data sets may include various other information about the employee (e.g., employee job title, clearance level, department) that incurred an expense and the context of the expense being incurred, for example, geographic information about where an expense or activity occurred (e.g., continent, country, state, city), temporal information about when an expense or activity occurred (e.g., date and time), categorical information about what type of an expense was incurred or activity performed (e.g., vendor identifier, vendor category, product identifier, product category, activity name, activity patterns), to aid in training the ML model for real world applications, and the expense amount.

In some embodiments, the ML model is trained based on the plurality of training data sets (Operation 304). The ML model is trained to improve at determining whether to generate expense reports based on transaction authorization data for unsettled transactions. The ML model is considered to improve when its decisions are less frequently overridden by a user of the system.

In some embodiments, the system obtains a transaction authorization data set for unsettled transactions with which the ML model is to be used for determining whether to generate expense reports for the transaction authorization data set (Operation 306). The transaction authorization data may be obtained from a card issuer 107 via a card issuer interface 106 as shown in and discussed with reference to FIG. 1 and FIGS. 2A and 2B.

In some embodiments, the system applies the trained ML model to the obtained transaction authorization data set to determine whether or not to generate an expense report on the transaction authorization data set (Operation 308). The system may independently make the determination based on the transaction authorization data set and prior patterns of data.

In some embodiments, if the ML model determines to refrain from generating an expense report on the transaction authorization data in Operation 308, the user is queried by the system about whether the user wishes to override the ML model's determination and proceed to generate the expense report on the transaction authorization data set, anyway (Operation 310). If the user does not override the ML model's determination, then the system refrains from generating the expense report on the transaction authorization data set (Operation 312) as the ML model had determined. In some embodiments, the user's implicit approval of the ML model's determination by not overriding it may reinforce the ML model's decision making processes. The system may then continue obtaining unsettled transaction authorization data as the method 300 proceeds.

In some embodiments, if the user decides to override the ML model's determination in Operation 310, the ML model is updated (Operation 314) based on the user's request to override the ML model's determination. In this way, the ML model's performance may be trained in an ongoing basis to make decisions with greater and greater congruence with the user's preferences.

In some embodiments, the system generates the expense report on the unsettled transaction authorization data (Operation 316). The system may generate the expense report responsive to the ML model determining to generate the expense report in Operation 308 or responsive to the user requesting to generate the expense report by overriding the ML model's determination to refrain from generating the expense report in Operation 308.

In some embodiments, after the system generates the expense report, the system may query the user or facilitate the user to request to not submit, and/or delete, the generated expense report (Operation 318). In some embodiments, the system may also facilitate or query the user to review, edit, and revise the generated expense report for more detailed control over the appearance and inclusion of data in the generated expense report. If the user is determined to not request to not submit the expense report in Operation 318, then the system may submit the expense report (Operation 324). For example, the expense reporting service 112 may submit the generated expense report to the reimbursement service 148.

In some embodiments, the if the user is determined to request to not submit the expense report in Operation 318, then the system updates the ML model based on the user request (Operation 320). For example, the ML model may be updated in its training to recognize that given the specific current circumstances with the given transaction authorization data and other contextual information, the ML model should in the future determine to not generate an expense report on the transaction authorization data. For embodiments in which the system provides more detailed control by the user over revisions and updates to the generated expense report, the ML model may be updated in its training according to the user's revisions and updates, also. After the ML model is updated based on the user request in Operation 320, the system may refrain from submitting the expense report (Operation 322) and proceed to continue obtaining unsettled transaction authorization data for processing. In various embodiments in which the user is given other options and/or makes other requests pertaining to the generated expense report such as deleting or revising the generated expense report, the user's requests may be carried out after or in conjunction with updating the ML model based on the user's requests.

Figure 4:
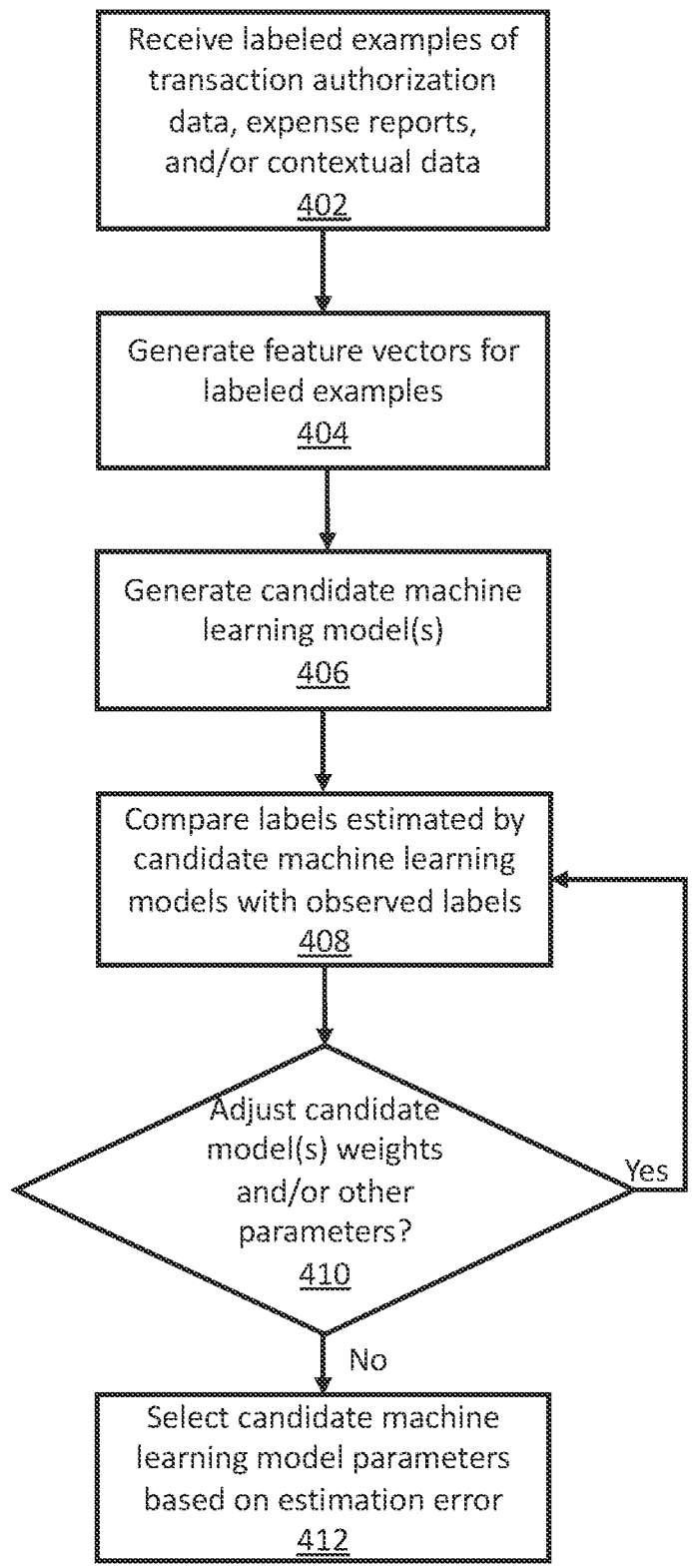
FIG. 4 illustrates an example set of operations for training a machine learning model to estimate unknown labels for expense data in accordance with one or more embodiments.

FIG. 4 illustrates an example set of operations for training a machine learning model to estimate unknown labels for expense data in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In some embodiments, a system (e.g., one or more components of system 100 illustrated in FIG. 1) receives a training dataset of labeled examples of transaction authorization data, expense reports, and/or contextual data for training a machine learning model (Operation 402). The training dataset may include any or all data sources that the system 100 may utilize in generating expense reports for an employee's transaction authorizations on a registered corporate card. An example in the training dataset may include one or more labels, where a label corresponds to a classification for one or more transaction authorization data sets or expense reports. For example, a label may indicate whether a transaction authorization data set or expense report required review or not by another user before reimbursement. As another example, a label may indicate how an expense was categorized. As another example, a label may indicate whether a transaction authorization data set or expense report required a user notification. As another example, a label may indicate a time of day that the user was notified. As another example, a label may indicate how many times the user was notified prior to receiving input from the user, when input was requested. As another example, a label may indicate a time period between notification attempts made by the system. The machine learning training may effectively assess users' behavior and determine how to make the expense reporting system easier for the employees to use to handle expense reporting. Some users may take action immediately upon receiving a notification, while other users may need to be reminded several times. Some users may want all notifications to be grouped together at a specific time for the user to handle, while other users may want them spread out, and still others want the notifications to be made in real time whenever a charge happens. The machine learning model could be trained on a per-user basis or on a collective basis to cover the range of employees in an organization.

In some embodiments, examples in the training set include multiple expenses and/or activities that are related. For instance, a single example may include a set of expenses and/or activities that were incurred by an employee on a single business trip. In this instance, the expenses and activities may be related (a) temporally since the expenses are likely to have occurred within a relatively short timeframe of the trip; (b) geographically since the trip was likely constrained to a limited number of locations; and (c) by entity since the expenses were incurred by the same employee.

In some embodiments, the system generates a set of feature vectors for the labeled examples (Operation 404). A feature vector for an example may be n-dimensional, where n represents the number of features in the vector. The number of features that are selected may vary depending on the particular implementation. The features may be curated in a supervised approach or automatically selected from extracted attributes during model training and/or tuning. Example features include information about the employee that incurred an expense (e.g., employee job title, clearance level, department), geographic information about where an expense or activity occurred (e.g., continent, country, state, city), temporal information about when an expense or activity occurred (e.g., date and time), categorical information about what type of an expense was incurred or activity performed (e.g., vendor identifier, vendor category, product identifier, product category, activity name, activity patterns), the expense amount. In some embodiments, a feature within a feature vector is represented numerically by one or more bits. The system may convert categorical attributes to numerical representations using an encoding scheme, such as one hot encoding.

In some embodiments, the system generates one or more candidate machine learning models that apply weights as a function of extracted features (Operation 406). In some cases, the system may generate and train a candidate recurrent neural network model, such as a long short-term memory (LSTM) model. With recurrent neural networks, one or more network nodes or "cells" may include a memory. A memory allows individual nodes in the neural network to capture dependencies based on the order in which feature vectors are fed through the model. The weights applied to a feature vector representing one expense or activity may depend on its position within a sequence of feature vector representations. Thus, the nodes may have a memory to remember relevant temporal dependencies between different expenses and/or activities. For example, a dinner expense in isolation may have a first set of weights applied by nodes as a function of the respective feature vector for the expense. However, if the dinner expense is immediately preceded by an earlier dinner expense, then a different set of weights may be applied by one or more nodes based on the memory of the preceding expense. In this case, whether a second dinner expense is reimbursable may require analysis by the system by evaluating the nature of the expense and subsequently may result in requesting additional information from the user. As another example, one or more nodes may apply different weights if an expense is unique or a duplicate of another expense on the same day. In this case, the trained machine learning model may automatically require user notification and additional information about duplicate expenses in lieu of rejecting duplicate expenses made on the same day outright, while recurring expenses (e.g., monthly subscriptions) may be permitted without requiring user notification and additional information. Additionally or alternatively, the system may generate and train other candidate models, such as support vector machines, decision trees, Bayes classifiers, and/or fuzzy logic models, as previously described.

In some embodiments, the system compares the labels estimated through the one or more candidate models with observed labels to determine an estimation error (Operation 408). The system may perform this comparison for a test set of examples, which may be a subset of examples in the training dataset that were not used to generate and fit the candidate models. The total estimation error for a candidate may be computed as a function of the magnitude of the difference and/or the number of examples for which the estimated label was wrongly predicted.

In some embodiments, the system determines whether to adjust the weights and/or other model parameters based on the estimation error (Operation 410). Adjustments may be made until a candidate model that minimizes the estimation error or otherwise achieves a threshold level of estimation error is identified. The process may return to Operation 408 to make adjustments and continue training the machine learning model.

In some embodiments, the system selects a candidate machine learning model parameters based on the estimation error (Operation 412). For example, the system may select a machine learning model having weights and other model parameters (e.g., selected feature combinations used to form the feature vectors) that yield the lowest estimation error for the test dataset.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. As previously mentioned, a given example may include a sequence of related expenses and/or activities incurred on a trip. Each expense or activity may be processed as a separate discrete instance of time. For instance, an example may include expenses $e_1$, $e_2$, and $e_3$ corresponding to times t, t+1, and t+2, respectively. Backpropagation through time may perform adjustments through gradient descent starting at time t+2 and moving backward in time to t+1 and then to t. Further, the backpropagation process may adjust the memory parameters of a cell such that a cell remembers contributions from previous expenses in the sequence of expenses. For example, a cell computing a contribution for $e_3$ may have a memory of the contribution of $e_2$, which has a memory of $e_1$. The memory may serve as a feedback connection such that the output of a cell at one time (e.g., t) is used as an input to the next time in the sequence (e.g., t+1). The gradient descent techniques may account for these feedback connections such that the contribution of one expense or activity to a cell's output may affect the contribution of the next expense or activity in the cell's output. Thus, the contribution of $e_1$ may affect the contribution of $e_2$, etc.

Additionally or alternatively, the system may train other types of machine learning models. For example, the system may adjust the boundaries of a hyperplane in a support vector machine or node weights within a decision tree model to minimize estimation error. Once trained, the machine learning model may be used to estimate labels for new examples of expenses.

5. Illustrative Examples

Illustrative examples are described below for purposes of clarity. Components and/or operations described below should be understood as one specific example which may not be applicable to certain embodiments. Accordingly, components and/or operations described below should not be construed as limiting the scope of any of the claims.

In accordance with an example, an expense reporting service receives a first transaction authorization data set from a card issuer including data resulting from an employee having used a registered card to initiate pumping gas at a gas station. The first transaction authorization data indicates that the authorization is an original authorization data set for the transaction and a pre-authorization type and does not include the final transaction amount. The expense reporting service determines, based on a trained machine learning algorithm, that the first transaction authorization data set does not meet the relevant expense report generation criteria, so the expense reporting service refrains from generating an expense report at this time. After the employee finishes pumping gas and returns the host to the gas pump, the employee takes the receipt printed out by the pump. After the gas pump hose handle is returned to the gas pump, the expense reporting service receives a second transaction authorization data set from the card issuer with the same authorization identification number to be matched to the first transaction authorization data set by the expense reporting service. The second transaction authorization data set indicates that the authorization is an updated authorization data set and an authorization type and does include the final transaction amount. The second transaction authorization data set is not settled. The expense reporting service determines, based on a trained machine learning algorithm, that the second transaction authorization data set meets the relevant expense report generation criteria. Subsequently, the expense reporting service generates an expense report for the gasoline purchase and notifies the employee that the expense report has been generated via SMS and/or an expense reporting app on the employee's mobile computing and communications device. Via the notification, the expense reporting service provides an opportunity for the employee to take a picture or mobile scan of the gas purchase receipt to upload and include with the generated expense report, for example, via a graphical user interface presented on the employee's mobile computing and communications device. Though transaction settlement data may not be available, the system may display the anticipated date of submission of the associated expense report based on a model of merchant data available for charge settlements and availability of additional data to enhance the transaction authorization data set and transaction settlement data set. Eventually, after several days, the expense reporting service receives transaction settlement data from the card issuer that corresponds to the transaction authorization data based upon which the expense report was generated. The expense reporting service evaluates the expense report based on the received transaction settlement data, merging the settlement data into the report, evaluates the expense report for adherence to corporate expense policies and guidelines, and notifies that employee that the expense report will be submitted on the scheduled date. The notification includes a summary of information of the expense report for the employee's information and review, but does not specifically request the employee to review and/or approve because the expense reporting service has already approved the expense report for submission based on evaluation in view of corporate expense policies and guidelines using a trained machine learning algorithm.

In accordance with an example, an expense reporting service receives a first transaction authorization data set from a card issuer including data resulting from an employee having used a registered corporate card to book a hotel online or by telephone. The first transaction authorization data indicates that the authorization is an original authorization data set for the transaction and a pre-authorization type and does not include the final transaction amount. The expense reporting service determines, based on a trained machine learning algorithm, that the first transaction authorization data set does not meet the relevant expense report generation criteria, so the expense reporting service refrains from generating an expense report at this time. After the employee reaches the travel destination, the employee checks into the hotel and presents the same corporate card at check-in. After the employee checks into the hotel, the expense reporting service receives a second transaction authorization data set from the card issuer with the same authorization identification number to be matched to the first transaction authorization data set by the expense reporting service. The second transaction authorization data set indicates that the authorization is an updated authorization data set and an authorization type, and does include a transaction hold amount corresponding to the length of the stay placed on the corporate card. The second transaction authorization data set is not settled. The expense reporting service determines, based on a trained machine learning algorithm, that the second transaction authorization data set does not meet the expense report generation criteria based on the model. Prior to the day of checking out of the hotel, the employee charges one restaurant meal and one room service to the employee's room. At the conclusion of the employee's stay at the hotel, the employee eats breakfast in the hotel restaurant, charges breakfast to the room by writing the room number and tip on the paper bill which the employee leaves on the restaurant table, and immediately checks out at the front desk. The hotel then submits an authorization request to the card issuer for the full amount of the hotel room stay plus the first two charges the employee made to the room in the prior days of the stay. The expense reporting service receives a third transaction authorization data set from the card issuer with the same authorization identification number to be matched to the first and second transaction authorization data sets by the expense reporting service. The third transaction authorization data set indicates that the authorization is an updated authorization data set and an authorization type, and does include a transaction amount corresponding to the length of the stay plus the first two room charges placed on the corporate card. The third transaction authorization data set meets the relevant expense report generation criteria. Subsequently, the expense reporting service generates an expense report for the hotel stay and the additional charges and notifies the employee that the expense report has been generated via SMS and/or an expense reporting app on the employee's mobile computing and communications device. The third transaction authorization data set is not settled. Later in the day, the hotel processes the room charge made on the morning of the employee checking out, and the expense reporting service receives a fourth transaction authorization data set from the card issuer with the same authorization identification number to be matched to the first through third transaction authorization data sets by the expense reporting service. The fourth transaction authorization data set indicates that the authorization is an updated authorization data set and an authorization type, and does include a transaction amount corresponding to the length of the stay plus all three room charges placed on the corporate card. The fourth transaction authorization data set is not settled. The hotel's merchant processing system automatically forwards the hotel receipt to the expense generation service (e.g., at the user's employer). The expense generation service enhances the received transaction authorization data with data extracted from the hotel receipt. Eventually, after several days, the expense reporting service receives transaction settlement data from the card issuer that corresponds to the transaction authorization data based upon which the expense report was generated and repeatedly updated. The expense reporting service evaluates the expense report based on the received transaction settlement data, merging the settlement data into the expense report, evaluates the expense report for adherence to corporate expense policies and guidelines, and notifies that employee that the expense report will be submitted on the scheduled date. The notification includes a summary of information of the expense report for the employee's information and review, but does not specifically request the employee to review and approve because the expense reporting service has already approved the expense report for submission based on evaluation in view of corporate expense policies and guidelines using a trained machine learning algorithm.

In accordance with an example, an employee makes a reservation at a restaurant (e.g., by telephone or using a restaurant reservation system such as OPENTABLE). The employee later, at the date and time of the reservation, goes to the restaurant to have dinner. At the conclusion of dinner, after the waiter provides the employee with the check itemizing the cost of the dinner, the employee presents the employee's corporate card to the waiter to pay for the dinner. The waiter then runs the corporate card at the restaurant's POS terminal to authorize a charge for the amount of the dinner, absent any tip that the employee may choose to leave. The expense reporting service receives a first transaction authorization data set from a card issuer including data resulting from the waiter running the card. The first transaction authorization data indicates that the authorization is an original authorization data set for the transaction, an authorization type, and includes the amount of the meal with no tip included. The expense reporting service determines, based on a trained machine learning algorithm, that the first transaction authorization data set does meet the relevant expense report generation criteria. Subsequently, the expense reporting service generates an expense report for the restaurant meal and notifies the employee that the expense report has been generated via SMS and/or an expense reporting app on the employee's mobile computing and communications device. Via the notification, the expense reporting service provides an estimated tip and provides an opportunity for the employee to take a picture or mobile scan of the restaurant receipt to upload and include with the generated expense report, for example, via a GUI presented on the employee's mobile computing and communications device. The employee figures out what tip to leave, writes it in pen on the restaurant copy and the customer copy of the charge receipt, signs the restaurant copy of the charge receipt, and takes a picture of the restaurant copy of the charge receipt for upload to include with the generated expense report via the GUI. The employee then takes his corporate card and his copy of the check and charge receipt and leaves the restaurant. The expense reporting service scans the receipt and updates the expenditure amount with the tip. Later in the evening, the waiter processes the signed charge receipt including the tip using the restaurant's POS terminal, and the expense reporting service receives a second transaction authorization data set from the card issuer with the same authorization identification number to be matched to the first transaction authorization data set by the expense reporting service. The second transaction authorization data set indicates that the authorization is an updated authorization data set and an authorization type, and includes a transaction amount corresponding to the restaurant meal plus the tip the employee left to be placed on the corporate card. The second transaction authorization data set is not settled. The expense reporting service determines that no update to the charge is expected, evaluates the expense report for adherence to corporate expense policies and guidelines, and notifies that employee that the expense report will be submitted on the scheduled date. The notification includes a summary of information of the expense report for the employee's information and review, but does not specifically request the employee to review and approve because the expense reporting service has already approved the expense report for submission based on evaluation in view of corporate expense policies and guidelines using a trained machine learning model. Eventually, after several days, the expense reporting service receives transaction settlement data from the card issuer that corresponds to the transaction authorization data based upon which the expense report was generated and updated. The expense reporting service evaluates the expense report based on the received transaction settlement data and determines that no action is required as the expense report is already submitted and the settled charge matches the expense.

In accordance with an example, an employee has an online account business profile with a taxi service. The employee logs into his online account with the taxi service to order a taxi and enters the corporate card information to reserve the taxi to go to a business meeting. The taxi service runs the corporate card information to authorize a charge. An expense reporting service receives a first transaction authorization data set from a card issuer including data resulting from the employee having used the corporate card to reserve the taxi. The first transaction authorization data indicates that the authorization is an original authorization data set for the transaction, an authorization type, and the card issuer is performing an address verification. The expense reporting service determines, based on a trained machine learning algorithm, that the first transaction authorization data set does not meet the relevant expense report generation criteria, so the expense reporting service refrains from generating an expense report at this time. The user then orders a taxi. The expense reporting service receives a second transaction authorization data set from the card issuer. The second transaction authorization data set indicates that the authorization is an original authorization data set and an authorization type, and includes a transaction amount corresponding to the full taxi fare without a tip. The second transaction authorization data set is not settled. The expense reporting service determines, based on a trained machine learning algorithm, that the second transaction authorization data set meets the relevant expense report generation criteria. Subsequently, the expense reporting service generates an expense report for the taxi fare and notifies the employee that the expense report has been generated via SMS and/or an expense reporting app on the employee's mobile computing and communications device. Later in the day, the employee uses the taxi service app to leave a tip for the taxi driver. The taxi service processes the tip made using the app by running the card again as a final charge for the full amount of taxi fare plus the tip. The expense reporting service receives a third transaction authorization data set from the card issuer with the same authorization identification number to be matched to the first and second transaction authorization data sets by the expense reporting service. The third transaction authorization data set indicates that the authorization is an updated authorization data set and an authorization type, and does include a transaction amount corresponding to the full taxi fare plus the tip placed on the corporate card. The third transaction authorization data set is not settled. Eventually, after several days, the expense reporting service receives transaction settlement data from the card issuer that corresponds to the transaction authorization data based upon which the expense report was generated and repeatedly updated. The expense reporting service evaluates the expense report based on the received transaction settlement data, merging the settlement data into the expense report, evaluates the expense report for adherence to corporate expense policies and guidelines, and notifies that employee that the expense report will be submitted on the scheduled date. The notification includes a summary of information of the expense report for the employee's information and review, but does not specifically request the employee to review and/or approve because the expense reporting service has already approved the expense report for submission based on evaluation in view of corporate expense policies and guidelines using a trained machine learning algorithm.

In accordance with an example, an employee has an online account with an ecommerce store. The employee logs into his online account to order a product and enters the corporate card information to pay for the product. The ecommerce store runs the corporate card information to authorize a charge for the purchase price of the product, and there are no shipping charges. An expense reporting service receives a first transaction authorization data set from a card issuer including data resulting from the employee having used the corporate card to order the product from the ecommerce store. The first transaction authorization data indicates that the authorization is an original authorization data set for the transaction, an authorization type, and is authorized for an amount equal to the product purchase price. The expense reporting service determines, based on a trained machine learning algorithm, that the first transaction authorization data set meets the relevant expense report generation criteria. Subsequently, the expense reporting service generates an expense report for the product purchase and notifies the employee that the expense report has been generated via SMS and/or an expense reporting app on the employee's mobile computing and communications device. Eventually, after several days, the expense reporting service receives transaction settlement data from the card issuer that corresponds to the transaction authorization data based upon which the expense report was generated. The expense reporting service evaluates the expense report based on the received transaction settlement data, merging the settlement data into the expense report, evaluates the expense report for adherence to corporate expense policies and guidelines, and notifies that employee that the expense report will be submitted on the scheduled date. The notification includes a summary of information of the expense report for the employee's information and review, but does not specifically request the employee to review and/or approve because the expense reporting service has already approved the expense report for submission based on evaluation in view of corporate expense policies and guidelines using a trained machine learning algorithm.

After the employee receives the purchased product from the ecommerce store, the employee decides to return the product for a refund. The employee requests a return authorization online and returns the product to the ecommerce store according to their instructions. After the ecommerce store receives the return, the ecommerce store authorizes a refund of the purchase price for the product to the corporate card. The expense reporting service receives a refund transaction authorization data set from the card issuer with a credit amount being refunded to the corporate card for the returned product. The refund transaction authorization data set indicates that the authorization data set is a refund authorization type, and includes a transaction amount corresponding to the full product purchase price refund. The refund transaction authorization data set is not settled. The expense reporting service determines, based on a trained machine learning algorithm, that the refund transaction authorization data set meets the relevant expense report generation criteria. Subsequently, the expense reporting service generates a refund expense report for the returned product refund and notifies the employee that the refund expense report has been generated via SMS and/or an expense reporting app on the employee's mobile computing and communications device. Eventually, after several days, the expense reporting service receives transaction settlement data from the card issuer that corresponds to the refund transaction authorization data based upon which the refund expense report was generated. The expense reporting service evaluates the refund expense report based on the received transaction settlement data, merging the settlement data into the refund expense report, evaluates the refund expense report for adherence to corporate expense policies and guidelines, and notifies that employee that the refund expense report will be submitted on the scheduled date. The notification includes a summary of information of the refund expense report for the employee's information and review, but does not specifically request the employee to review and/or approve because the expense reporting service has already approved the refund expense report for submission based on evaluation in view of corporate expense policies and guidelines using a trained machine learning algorithm.

5. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
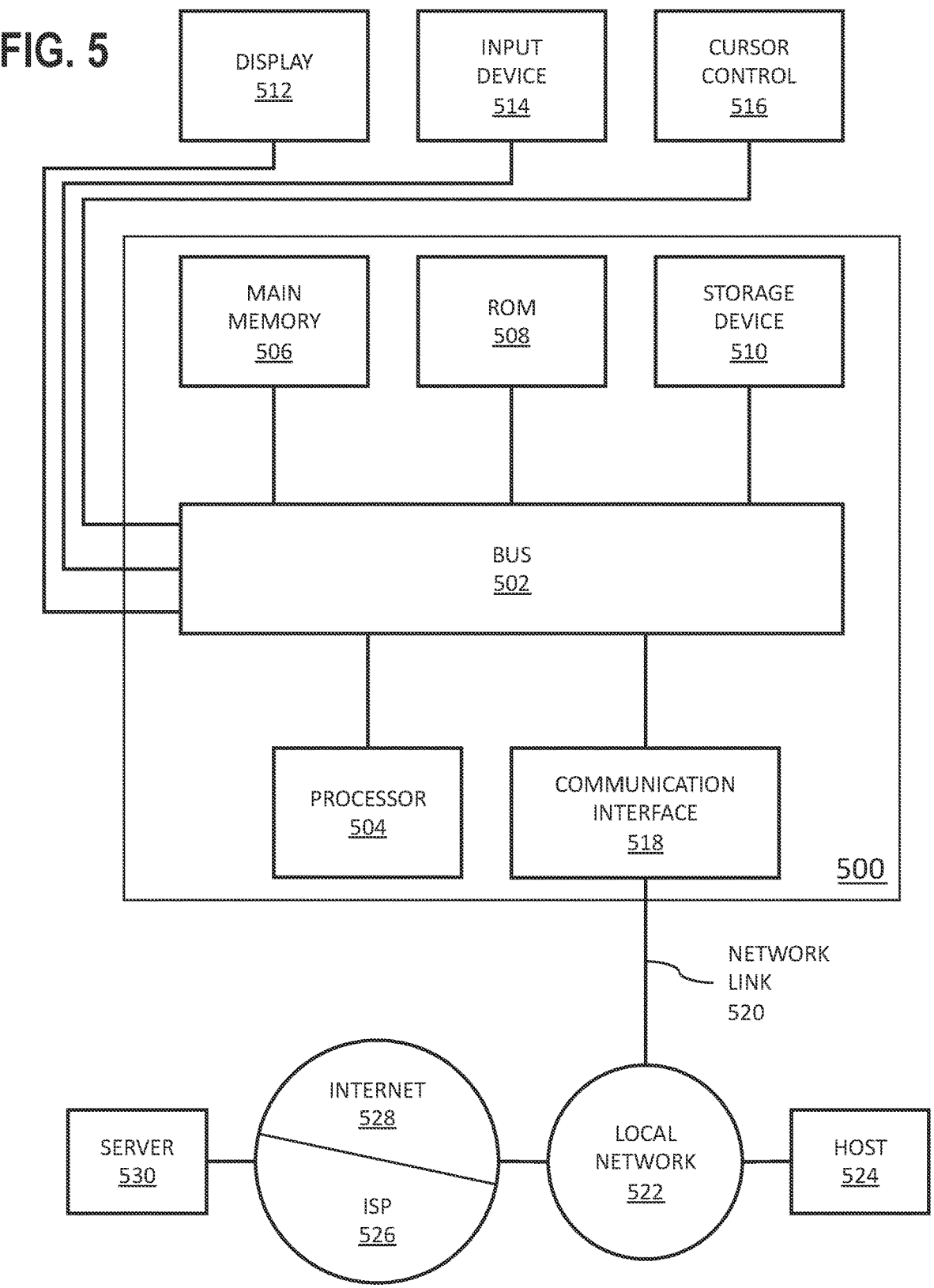
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), plasma display, electronic ink display, cathode ray tube (CRT) monitor, or any other kind of device for displaying information to a computer user. An input device 514, including alphanumeric and other keys, may be coupled to bus 502 for communicating information and command selections to processor 504. Alternatively or in addition, the computer system 500 may receive user input via a cursor control 516, such as a mouse, a trackball, a trackpad, a touchscreen, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. The display 512 may be configured to receive user input via one or more pressure-sensitive sensors, multi-touch sensors, and/or gesture sensors. Alternatively or in addition, the computer system 500 may receive user input via a microphone, video camera, and/or some other kind of user input device (not shown).

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 500 can receive the data from the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   obtaining a plurality of training data sets, each training data set comprising:
   (a) a transaction authorization data for a particular transaction in an authorized pre-settlement state, and
   (b) an indication of whether an expense report is to be generated for the particular transaction;
   training a machine learning model to yield a trained machine learning model based on the plurality of training data sets to determine whether to generate expense reports based on transaction authorization data for unsettled transactions;

receiving, at an interface from a card issuer, a transaction authorization data stream generated and sent by the card issuer to the interface in real time subsequent to requests of the card issuer to authorize point-of-sale (POS) transactions;

monitoring the transaction authorization data stream to identify a first set of transaction authorization data;

prior to settlement of a first transaction of the POS transactions, applying the trained machine learning model to the first set of transaction authorization data, for the first transaction, to determine whether to generate an expense report corresponding to the first transaction;

based on output of the trained machine learning model, determining to generate the expense report corresponding to the first transaction;

generating, by an expense report generation system, the expense report corresponding to the first transaction based on the first set of transaction authorization data;

monitoring the transaction authorization data stream to identify a second set of transaction authorization data;

comparing the second set of transaction authorization data, for a second transaction, to expense report generation criteria to determine whether to generate an expense report corresponding to the second transaction prior to settlement of the second transaction;

determining that the expense report generation criteria to generate the expense report corresponding to the second transaction-has not been met; and responsive to determining that the expense report generation criteria has not been met for the second transaction, refraining from generating, by the expense report generation system, the expense report corresponding to the second transaction based on the second set of transaction authorization data.

2. The one or more non-transitory machine-readable media of claim 1, further storing instructions which, when executed by one or more processors, cause:

monitoring a transaction settlement data stream;

based on the monitoring the transaction settlement data stream: determining, by the expense report generation system, that the first transaction has not been settled within a threshold period of time after the first transaction was authorized; and responsive to determining that the first transaction has not been settled within the threshold period of time: removing, by the expense report generation system, the expense report corresponding to the first transaction from a data repository.

3. The one or more non-transitory machine-readable media of claim 1, further storing instructions which, when executed by one or more processors, cause:

subsequent to generating the expense report corresponding to the first transaction based on the first set of transaction authorization data:

monitoring a transaction settlement data stream to identify a first set of transaction settlement data corresponding to the first transaction;

determining that the first transaction has been settled in accordance with the first set of transaction authorization data and within a threshold period of time after the first transaction was authorized; and responsive to determining that the first transaction has been settled within the threshold period of time: updating, by the expense report generation system, the expense report corresponding to the first transaction to reflect a settlement status of the first transaction.

4. The one or more non-transitory machine-readable media of claim 3, wherein updating the expense report corresponding to the first transaction comprises setting an expense amount of the expense report based on an expense amount of the first set of transaction settlement data.

5. The one or more non-transitory machine-readable media of claim 1, further storing instructions which, when executed by one or more processors, cause:

monitoring the transaction authorization data stream to identify a third set of transaction authorization data, corresponding to the first transaction, that is generated prior to settlement of the first transaction; and updating the expense report corresponding to the first transaction based on the third set of transaction authorization data.

6. The one or more non-transitory machine-readable media of claim 1, further storing instructions which, when executed by one or more processors, cause:

monitoring the transaction authorization data stream to identify a third set of transaction authorization data corresponding to the second transaction;

comparing the third set of transaction authorization data, for the second transaction, to expense report generation criteria to determine whether to generate an expense report corresponding to the second transaction prior to settlement of the second transaction;

determining that the expense report generation criteria to generate the expense report corresponding to the second transaction has been met; and responsive to determining that the expense report generation criteria has been met for the second transaction: generating, by the expense report generation system, the expense report corresponding to the second transaction based on the third set of transaction authorization data.

7. The one or more non-transitory machine-readable media of claim 1, further storing instructions which, when executed by one or more processors, cause:

monitoring, subsequent to refraining from generating the expense report corresponding to the second transaction based on the second set of transaction authorization data, a transaction settlement data stream to identify a first set of transaction settlement data corresponding to the second transaction;

comparing, by the expense report generation system, the first set of transaction settlement data to the expense report generation criteria to determine whether to generate an expense report corresponding to the second transaction;

determining, by the expense report generation system, that the expense report generation criteria to generate the expense report corresponding to the second transaction has been met; and responsive to determining that the expense report generation criteria has been met for the second transaction: generating the expense report corresponding to the second transaction based on the first set of transaction settlement data.

8. The one or more non-transitory machine-readable media of claim 1, further storing instructions which, when executed by one or more processors, cause:

submitting the expense report for the first transaction without user review of the expense report.

9. The one or more non-transitory machine-readable media of claim 1, wherein the expense report generation criteria comprises contextual data.

10. The one or more non-transitory machine-readable media of claim 1, wherein the expense report generation criteria comprises user profile data.

11. The one or more non-transitory machine-readable media of claim 1, wherein the expense report generation criteria defines a minimum expense amount.

12. The one or more non-transitory machine-readable media of claim 1, wherein the expense report generation criteria defines a type of merchant.

13. The one or more non-transitory machine-readable media of claim 1, wherein the expense report generation criteria defines an expense category.

14. One or more non-transitory machine-readable media storing instructions which, when executed by one or more processors, cause:
obtaining a plurality of training data sets, each training data set comprising:
(a) a transaction authorization data for a particular transaction in an authorized pre-settlement state, and
(b) an indication of whether an expense report is to be generated for the particular transaction;
training a machine learning model to yield a trained machine learning model based on the plurality of training data sets to determine whether to generate expense reports based on transaction authorization data for unsettled transactions;
receiving, at an interface from a card issuer, a transaction authorization data stream generated and sent by the card issuer to the interface in real time subsequent to requests of the card issuer to authorize point-of-sale (POS) transactions;
monitoring the transaction authorization data stream to identify a first set of transaction authorization data for a first transaction;
comparing the first set of transaction authorization data to an expense report generation criteria to determine whether to generate an expense report corresponding to the first transaction prior to settlement of the first transaction;
automatically determining that the expense report generation criteria to generate the expense report corresponding to the first transaction has been met;
responsive to determining that the expense report generation criteria has been met for the first transaction, generating the expense report corresponding to the first transaction based on the first set of transaction authorization data;
monitoring a transaction settlement data stream to identify a first set of transaction settlement data corresponding to the first transaction;
based on the first set of transaction settlement data, modifying the expense report that was based on the first set of transaction authorization data;
monitoring the transaction authorization data stream to identify a second set of transaction authorization data for a second transaction;
prior to settlement of the second transaction, applying the trained machine learning model to the second set of transaction authorization data to determine whether to generate an expense report corresponding to the second transaction; and
generating, by an expense report generation system, the expense report corresponding to the second transaction based on the second set of transaction authorization data.

15. The one or more non-transitory machine-readable media of claim 14, further storing instructions which, when executed by one or more processors, cause:
submitting the expense report for the first transaction based on the first set of transaction authorization data without user review of the expense report; and
submitting the modified expense report for the first transaction based on the first set of transaction settlement data without user review of the expense report.

16. The one or more non-transitory machine-readable media of claim 14, further storing instructions which, when executed by one or more processors, cause:
comparing the first set of transaction authorization data, for the first transaction, to an expense report notification criteria to determine whether to notify a user regarding the expense report corresponding to the first transaction;
determining that the expense report notification criteria to notify the user regarding the expense report has been met; and
responsive to determining that the expense report notification criteria has been met for the first transaction, notifying the user regarding the expense report corresponding to the first transaction.

17. The one or more non-transitory machine-readable media of claim 14, further storing instructions which, when executed by one or more processors, cause:
comparing data regarding a user to an expense report notification criteria to determine whether to notify the user regarding the expense report corresponding to the first transaction;
determining that the expense report notification criteria to notify the user regarding the expense report has been met; and
responsive to determining that the expense report notification criteria has been met for the first transaction, notifying the user regarding the expense report corresponding to the first transaction.

18. The one or more non-transitory machine-readable media of claim 14, further storing instructions which, when executed by one or more processors, cause:
comparing data regarding a user's historical patterns of taking actions based on expense report notifications to an expense report notification criteria to determine whether to notify the user regarding the expense report corresponding to the first transaction;
determining that the expense report notification criteria to notify the user regarding the expense report has been met; and
responsive to determining that the expense report notification criteria has been met for the first transaction, notifying the user regarding the expense report corresponding to the first transaction.

19. The one or more non-transitory machine-readable media of claim 14, further storing instructions which, when executed by one or more processors, cause:
comparing whether the first set of transaction authorization data is an update to previously received transaction authorization data, for the first transaction, to an expense report notification criteria to determine whether to notify a user regarding the expense report corresponding to the first transaction;
determining that the expense report notification criteria to notify the user regarding the expense report has been met; and
responsive to determining that the expense report notification criteria has been met for the first transaction, notifying the user regarding the expense report corresponding to the first transaction.

20. The one or more non-transitory machine-readable media of claim 14, further storing instructions which, when executed by one or more processors, cause:
- comparing data regarding a user and the first set of transaction authorization data, for the first transaction, to an expense report notification criteria to determine whether to notify the user regarding the expense report corresponding to the first transaction;
- determining that the expense report notification criteria to notify the user regarding the expense report has been met; and
- responsive to determining that the expense report notification criteria has been met for the first transaction, notifying the user regarding the expense report corresponding to the first transaction.

21. One or more non-transitory machine-readable media storing instructions which, when executed by one or more processors, cause:
- obtaining, by an expense report generation system, a plurality of training data sets, each training data set comprising:
  - (a) a transaction authorization data for a particular transaction in an authorized pre-settlement state, and
  - (b) an indication of whether an expense report is to be generated for the particular transaction;
- training, by an expense report generation system, a machine learning model based on the plurality of training data sets to determine whether to generate expense reports based on transaction authorization data for unsettled transactions;
- applying, by an expense report generation system, the machine learning model to a first set of transaction authorization data for a first unsettled target transaction to determine that a first expense report is to be generated;
- generating, by an expense report generation system, the first expense report based on the first set of transaction authorization data;
- applying, by an expense report generation system, the machine learning model to a second set of transaction authorization data for a second unsettled target transaction to determine that no second expense report is to be generated based on the second set of transaction authorization data; and
- refraining from generating, by an expense report generation system, the second expense report based on the second set of transaction authorization data.

22. The one or more non-transitory machine-readable media of claim 21, further storing instructions which, when executed by one or more processors, cause:
- receiving, by an expense report generation system, a user input requesting generation of an expense report for the second set of transaction authorization data;
- responsive to the user input requesting generation of an expense report, generating, by an expense report generation system, the expense report based on the second set of transaction authorization data; and
- updating, by an expense report generation system, the machine learning model based on the user input.

23. The one or more non-transitory machine-readable media of claim 21, further storing instructions which, when executed by one or more processors, cause:
- receiving, by an expense report generation system, user input requesting to not submit the expense report for the first set of transaction authorization data;
- responsive to the user input requesting to not submit the expense report, refraining from submitting, by an expense report generation system, the expense report based on the first set of transaction authorization data; and
- updating, by an expense report generation system, the machine learning model based on the user input.

24. The one or more non-transitory machine-readable media of claim 21, further storing instructions which, when executed by one or more processors, cause:
- receiving, by an expense report generation system, user input requesting to revise the expense report for the first set of transaction authorization data;
- responsive to the user input requesting to revise the expense report, revising, by an expense report generation system, the expense report based on the first set of transaction authorization data according to the user input request; and
- updating, by an expense report generation system, the machine learning model based on the user input.

25. The one or more non-transitory machine-readable media of claim 21, further storing instructions which, when executed by one or more processors, cause:
- submitting the first expense report for the first set of transaction authorization data without user review of the expense report.

* * * * *